(12) United States Patent
Mercat et al.

(10) Patent No.: US 8,414,434 B2
(45) Date of Patent: Apr. 9, 2013

(54) TRANSMISSION DEVICE FOR A CYCLE

(75) Inventors: Jean-Pierre Mercat, Chavanod (FR); Brieuc Cretoux, Firminy (FR)

(73) Assignee: Mavic S.A.S., Metz-Tessy (FR)

( * ) Notice: Subject to any disclaimer, the term of this patent is extended or adjusted under 35 U.S.C. 154(b) by 670 days.

(21) Appl. No.: 12/642,052

(22) Filed: Dec. 18, 2009

(65) Prior Publication Data

US 2010/0167854 A1  Jul. 1, 2010

(30) Foreign Application Priority Data

Dec. 19, 2008 (FR) .................... 08 07251

(51) Int. Cl.
*F16H 9/00* (2006.01)

(52) U.S. Cl. .............. 474/72; 474/78; 474/80

(58) Field of Classification Search .......... 474/72, 474/78, 80
See application file for complete search history.

(56) References Cited

U.S. PATENT DOCUMENTS

| | | | |
|---|---|---|---|
| 2,042,861 A * | 6/1936 | Pehl .............. | 280/238 |
| 4,218,931 A | 8/1980 | Tritenne | |
| 4,854,191 A * | 8/1989 | Nagano .......... | 475/289 |
| 5,975,266 A | 11/1999 | Balhorn | |
| 6,264,575 B1 * | 7/2001 | Lim et al. ........ | 474/77 |
| 6,537,173 B2 | 3/2003 | Mercat et al. | |
| 6,640,938 B2 * | 11/2003 | Shoge ........... | 188/24.11 |
| 7,708,295 B2 * | 5/2010 | Wesling et al. ... | 280/260 |
| 2006/0058134 A1 | 3/2006 | Mercat et al. | |
| 2007/0210552 A1 | 9/2007 | Nicolai | |
| 2007/0254767 A1 | 11/2007 | Okochi | |
| 2008/0167148 A1 | 7/2008 | Siah | |
| 2008/0252037 A1 | 10/2008 | Wesling et al. | |
| 2008/0300096 A1 | 12/2008 | Wesling et al. | |

FOREIGN PATENT DOCUMENTS

| | | |
|---|---|---|
| CH | 253 158 A | 2/1948 |
| DE | 197 12 444 A1 | 10/1998 |
| DE | 10 2004 045 364 A1 | 3/2006 |
| EP | 1 145 947 A1 | 10/2001 |
| EP | 1 849 700 A1 | 10/2007 |
| EP | 1 944 230 A2 | 7/2008 |
| EP | 1 980 483 A1 | 10/2008 |
| FR | 2 851 222 A1 | 8/2004 |
| GB | 444433 A | 3/1936 |

* cited by examiner

*Primary Examiner* — Sang Kim
(74) *Attorney, Agent, or Firm* — Greenblum & Bernstein, P.L.C.

(57) ABSTRACT

A transmission device for a cycle, such as a bicycle, which includes a bottom bracket fixed relative to the remainder of the cycle frame. The device includes a cylindrical main body centered about a first axis and a secondary body centered about a second axis, the second axis being parallel to, but not merged with, the first axis; a crankset rotationally mounted along the first axis relative to the main body and including a pair of cranks, a first circular toothed element and a second circular toothed element, both being centered on the first axis; a chainwheel rotationally mounted along the second axis relative to the secondary body and including a third circular toothed element and a fourth circular toothed element, both being centered on the second axis; the first and third toothed elements and the second and fourth toothed elements constituting a first gear train and a second gear train, respectively; a disengageable blocking device provided to block, selectively, the rotation of the first toothed element relative to the crankset or the rotation of the third toothed element relative to the chainwheel, on the one hand, and the rotation of the second toothed element relative to the crankset or the rotation of the fourth toothed element relative to the chainwheel, on the other hand.

15 Claims, 17 Drawing Sheets

TRANSMISSION DEVICE FOR A CYCLE

CROSS-REFERENCE TO RELATED APPLICATION

This application claims priority under 35 U.S.C. §119 of French Patent Application No. 08 07251, filed on Dec. 19, 2008, the disclosure of which is hereby incorporated by reference thereto in its entirety.

BACKGROUND OF THE INVENTION

1. Field of the Invention

The invention relates to transmission devices for a cycle. In particular, the invention relates to a transmission device with gear shift.

2. Description of Background

For a cycle, such as a bicycle, the transmission includes the assembly of mechanical means by which the cyclist's pedaling force is transmitted to a driving wheel.

Such transmissions can include those means required for changing gears or, to be more precise, the means for changing the gear ratio. Such means were implemented as of the invention of the pedal-equipped velocipede in the second half of the 19th century. The overall transmission ratio, which is hereafter referred to as the gear ratio of the transmission device, corresponds to the rotational speed ratio between "the input", i.e., the pedaling speed, and the "output", i.e., the rotational speed of the driving wheel. In cycles whose pedaling axis is not merged with the driving wheel axis, the modification of the transmission ratio can be carried out either in the area of the bottom bracket, or in the area of the driving wheel, or at both locations.

In a conventional bicycle, the rear wheel is the driving wheel and the pedaling axis is positioned forward of the driving wheel. For reasons of clarity in the following description, the expression "gear ratio" refers to the ratio between the angular speeds of pedaling and the rear wheel, whereas "transmission ratio" refers only to what occurs in the area of the crankset.

Over the years, cycle manufacturers have proposed a number of transmission devices including ratio changing means. The most widely used ratio changing means include one or more toothed chainwheels driven by the pedals at the input, and one or more toothed sprockets which drive the rear wheel at the output. A hollow-link chain connects the input to the output. The ratio change, strictly speaking, involves changing the position of the chain relative to the sprockets and/or to the chainwheels. This shift of the chain position is carried out by one or more derailleurs.

The patent documents EP 1 944 230 and US 2008/0167148 disclose a front derailleur that enables the position of the chain to be changed relative to the chainwheels. In such a device, the change in the position of the chain occurs on the tension side the chain. This is why it is not possible, or not recommended in any case, to operate the front derailleur when a force is being exerted on the pedals. In practice, the user releases the force before and during each ratio change. The loss of efficiency for the cyclist due to the derailleurs is therefore understood.

In a conventional bicycle according to the prior art and, in particular, in a bicycle equipped with a front derailleur, such as that disclosed in the patent documents EP 1 944 230 and US 2008/0167148, the transmission device thereof includes a crankset equipped with two or three front chainwheels, a chain, and a rear sprocket cassette. The means for changing the gear ratio include a front derailleur associated with a front control lever positioned on the left portion of the handlebar, and a rear derailleur associated with a rear control lever positioned on the right portion of the handlebar.

The two front chainwheels include 39 and 53 teeth, respectively, whereas the cassette includes 10 rear sprockets including 11, 12, 13, 14, 15, 16, 17, 19, 21, and 23 teeth, respectively. This is a conventional configuration for a road bicycle. Each gear ratio is constituted by the association of a front chainwheel and a rear sprocket. Theoretically, 20 transmission ratios can be envisioned with such a device (2 chainwheels multiplied by 10 sprockets). In practice, there are only approximately 16 distinct transmission ratios, as can be seen in Table 1 below.

TABLE 1

| Gear ratio No. | Number of chainwheel teeth | Number of sprocket teeth | Gear ratio value | Variation |
|---|---|---|---|---|
| 1 | 53 | 11 | 4.818 | |
| 2 | 53 | 12 | 4.417 | 9.09% |
| 3 | 53 | 13 | 4.077 | 8.33% |
| 4 | 53 | 14 | 3.786 | 7.69% |
| 5 | 53 | 15 | 3.533 | 7.14% |
| 6 | 53 | 16 | 3.313 | 6.67% |
| 7 | 53 | 17 | 3.118 | 6.25% |
| 8 | 53 | 19 | 2.789 | 11.76% |
| 9 | 53 | 21 | 2.524 | 10.53% |
| 10 | 53 | 23 | 2.304 | 9.52% |
| 11 | 39 | 11 | 3.545 | 35.01% |
| 12 | 39 | 12 | 3.250 | 9.09% |
| 13 | 39 | 13 | 3.000 | 8.33% |
| 14 | 39 | 14 | 2.786 | 7.69% |
| 15 | 39 | 15 | 2.600 | 7.14% |
| 16 | 39 | 16 | 2.438 | 6.67% |
| 17 | 39 | 17 | 2.294 | 6.25% |
| 18 | 39 | 19 | 2.053 | 11.76% |
| 19 | 39 | 21 | 1.857 | 10.53% |
| 20 | 39 | 23 | 1.696 | 9.52% |

In Table 1, each line corresponds to one of the twenty gear ratios. Each column contains from left to right, respectively, the number of the ratio, the number of chainwheel teeth, the number of sprocket teeth, the numerical value of the gear ratio, and the variation, expressed as a percentage, separating this numerical value from the value of the preceding line.

The gear ratio is equal to the ratio of the number of chainwheel teeth to the number of sprocket teeth.

Several weaknesses of this transmission system can be emphasized. First, as shown in Table 1, the same transmission ratios are repeated several times. Moreover, some of these transmission ratios cannot be used in reality because of the chain misalignment between the chainwheels and the sprockets of the rear wheel. This generates friction of the chain on the front derailleur, the noise from which is extremely unpleasant for the cyclist, and causes a drop in efficiency and increased wear on the chain. In addition, the transitions between the various ratios are not always very progressive. This can be estimated using a variation percentage between two consecutive ratios. Beyond 10% (as shown in bold face in the table), the transition is not considered to be progressive at all. Finally, it is not always easy to operate a change of chainwheel while the cyclist is exerting force because the front derailleur acts on the tensioned side of the chain, which causes a break in the pedaling rate, and can have a negative effect for the cyclist, particularly in professional cycling.

In conclusion, it is not easy for the user to have an optimal control of such a system for changing ratios, because cyclist must be aware of the positioning of the chain—which chainwheel and which sprocket are involved—before each change of ratio. Indeed, the control action to undertake, whether for actuating the control of the front, of the rear, or of both derailleurs, is dependent upon this positioning.

The patent documents EP 1 145 947 and U.S. Pat. No. 6,537,173 disclose a device that overcomes some of the weaknesses of conventional transmission devices. This device uses a single toothed chainwheel which, because it is expansible, fulfills the same function as two chainwheels. However, the use of expansible chainwheels requires the installation of complex mechanisms with numerous moving parts which must withstand and transmit the pedaling torque. In practice, these systems were never developed far enough to offer a viable alternative to the conventional system.

Prior to the invention of the front derailleur, various solutions using gears had been proposed for changing the ratio in the area of the crankset. These solutions were quickly abandoned and did not achieve the success of the derailleur, in particular due to their cost, the need to have a specific frame, brittleness, and especially poor efficiency. There are new ideas from time to time which use the principle of gears to change the gear ratio in the area of the crankset. The device disclosed in the patent document U.S. Pat. No. 4,218,931 is a step-down crankset. The crankset therein drives a sprocket having external teeth, which meshes with a crown having internal teeth, which is offset with respect to the crankset. The crown is affixed to the toothed chainwheel which receives the transmission chain. The transmission ratio between the pedaling speed and the rotational speed of the chainwheel is determined by the ratio of the diameters of the sprocket and of the crown. In this device, the transmission ratio is fixed and cannot be modified in the area of the crankset.

The patent documents EP 1 980 483 and US 2008/0252037 disclose a crankset having a mechanism for changing the transmission ratio. The mechanism is a planetary gear train which makes it possible to obtain two transmission ratios. The first of these transmission ratios is equal to 1 when the rotation of the planetary gear (the sprocket with external teeth) is free, whereas the second ratio is substantially greater than 1 when the rotation of the planetary gear is blocked. Such a crankset with transmission ratio change has a number of disadvantages. First, taking into account the kinematic constraints of the planetary gear trains, the geometrical constraints of the location of the pedaling axis on a bicycle, it is not possible to make a crankset having a transmission ratio close to 1, i.e., less than 1.15, preferably less than 1.10, in this manner. Indeed, to make such a crankset with a planetary gear train having a ratio close to 1, the satellites must have a number of teeth on the same order of magnitude as the planetary gear, which would result in having a large diameter crankset. However, it is important for the ground clearance to be as substantial as possible.

Furthermore, in view of the large number of mechanical parts, a planetary gear crankset is expensive, heavy, and performs poorly. Moreover, the currently commercially available products which use planetary gear trains are recommended for mountain bicycles dedicated to the downhill disciplines, in which the weight is not such a determinant factor.

Lastly, because it is not possible to obtain a transmission ratio close to 1, the planetary gear cranksets are not easy to use if not coupled to a transmission ratio changing device positioned on the rear wheel. Indeed, for the user, it is desirable for the variations between the gear ratios to be constant and not too far from one another. A range of variations from 5% to 10% between two consecutive gear ratios on road bicycle and between 7% and 15% in VTT is provided by way of example.

SUMMARY

The invention provides a ratio changing transmission device for a cycle, which allows for gear ratio changes.

The invention also provides a gear ratio changing transmission device that the user can control optimally in a simple fashion.

Additionally, the invention provides a transmission device for which the change of ratio in the area of the crankset only requires minimal mechanical effort, and which does not require maneuvering the tensioned side of the chain.

To these ends, the invention provides a transmission device for a cycle, which includes the following:

- a bottom bracket that is fixed relative to the cycle frame and includes a cylindrical main body centered about a first axis A1, and a secondary body centered about a second axis A2, the second axis A2 being parallel to but not coincident, or merged, with the first axis A1;
- a crankset rotationally mounted along the first axis A1 relative to the main body and including a pair of cranks, a first circular toothed element and a second circular toothed element, both being centered on the first axis A1;
- a chainwheel rotationally mounted along the second axis A2 relative to the secondary body and including a third circular toothed element and a fourth circular toothed element, both being centered on the second axis A2;
- the first and third toothed elements and the second and fourth toothed elements constituting a first gear train and a second gear train, respectively;
- at least one of the first, second, third, and fourth toothed elements having internal teeth;
- a disengageable blocking device provided to alternatively, or selectively, block the rotation of the first toothed element relative to the crankset or the rotation of the third toothed element relative to the chainwheel, on the one hand, and the rotation of the second toothed element relative to the crankset or the rotation of the fourth toothed element relative to the chainwheel, on the other hand.

In an embodiment of the invention, the disengageable blocking device includes at least a first and second pawls which cooperate with a plurality of notches, the first pawl allowing the unidirectional rotation of the first toothed element relative to the crankset or of the third toothed element relative to the chainwheel, and the second pawl allowing the unidirectional rotation of the second toothed element relative to the crankset or of the fourth toothed element relative to the chainwheel.

In a particular embodiment, one of the at least two pawls is controlled by a control device that can be controlled by the user, and the other of the at least two pawls is free.

In a particular embodiment, a mechanism for actuating the controlled pawl is provided, which includes a plate provided to retract the controlled pawl from an engaged position in one of the notches, as well as a cam that can assume either of two stable positions under the action of the control device.

In an embodiment of the invention, the first toothed element is a large crown with internal teeth, the second toothed element is a small crown with internal teeth, the third toothed element is a large sprocket with external teeth, and the fourth toothed element is a small sprocket with external teeth. The plurality of notches can then be positioned on the large crown, on the one hand, and on the small crown, on the other hand.

In another embodiment, the first toothed element is a sprocket with external teeth, the second toothed element is a crown with internal teeth, the third toothed element is a crown with internal teeth, and the fourth toothed element is a sprocket with external teeth. The plurality of notches can then be positioned on the third toothed element, on the one hand, and on the fourth toothed element, on the other hand.

The invention also encompasses a cycle, such as a bicycle, equipped with a transmission device such as described hereinabove.

BRIEF DESCRIPTION OF DRAWINGS

Other characteristics and advantages of the invention will be better understood from the description that follows, with reference to the annexed drawings illustrating, in a non limiting fashion, how the invention can be embodied, and in which:

FIG. 5a is a cross-sectional view of the first embodiment;

DETAILED DESCRIPTION

Figure 1:
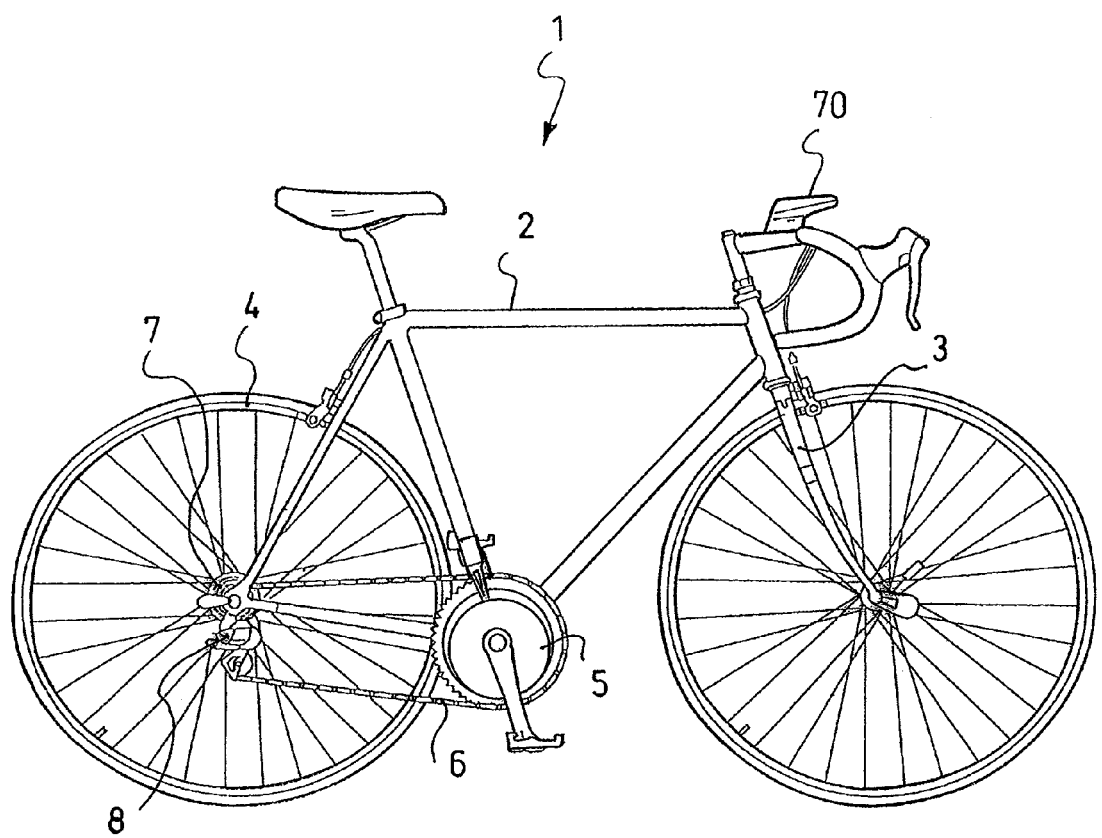
FIG. 1 is a view of a bicycle according to the invention.

FIG. 1 shows a bicycle 1 equipped with a transmission device according to a first embodiment of the invention. In a known configuration, the bicycle 1 includes a frame 2 on which a rear wheel 4 is mounted, a fork 3 rotationally mounted on the frame 2, with a front wheel and a handlebar mounted to the fork. The transmission includes a crankset 5, a chain 6, and a rear sprocket cassette 7 mounted on the rear wheel. The cassette is rotationally affixed, in the direction of traction, to the rear wheel via of a freewheel hub.

The presence of a rear sprocket cassette is not a limiting characteristic of the invention, the invention encompassing embodiments in which the sprocket cassette is replaced by a single sprocket, the latter being associated or not associated with a hub comprising an integrated ratio changing mechanism, of the type described in the patent document EP 1 849 700 and in US 2007/0254767, the disclosure of the latter of which is hereby incorporated by reference thereto in its entirety.

As described further below, the device of the invention is equipped with a freewheel in the area of the crankset, so that it is not necessary for the sprocket cassette (or the sprocket) of the rear wheel also to be equipped with freewheel mechanisms.

In the exemplary illustrated embodiment, the cassette 7 is associated with a derailleur 8 that can be controlled electrically. The cassette 7 includes 8 sprockets respectively having 12, 14, 16, 18, 21, 24, 28, and 32 teeth. Neither the number of sprockets nor the number of teeth that each of them comprise constitute limitations. These are non-limiting examples intended to show one of the advantages of the invention over the prior art.

The transmission device also includes a control device 70, which is shown in FIG. 1 to be mounted on the bicycle handlebar, although it can be mounted in another location, such as on the frame, for example. The control device includes a human/machine interface, data processor, as well as right and left actuating levers as disclosed, for example, in the patent documents FR 2 851 222 and in US 2006/0058134, the disclosure of the latter of which is hereby incorporated by reference thereto in its entirety.

The transmission device according to the invention is depicted herein, and shown in FIG. 1, as a transmission chain 6. This is not a limiting characteristic of the invention. Indeed, the device of the invention can be used in combination with any other means, such as a belt, for example, to transmit the pedaling torque to the driving wheel.

Figure 2:
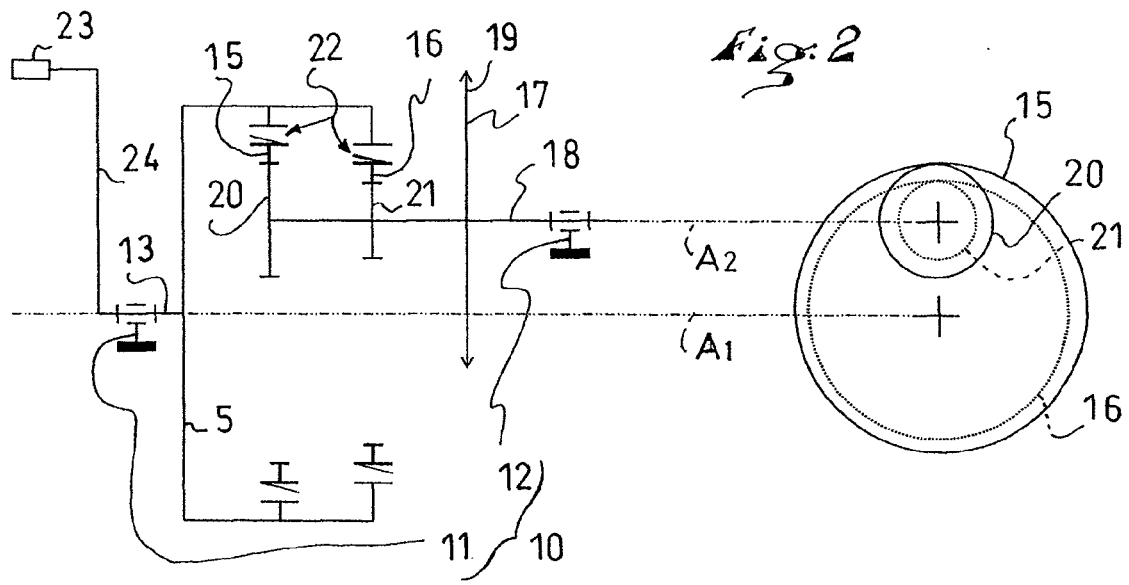
FIG. 2 is the kinematic diagram of a device according to a first embodiment of the invention.

FIG. 2 shows the kinematic diagram of the first embodiment of the invention. According to the invention, the transmission device includes a bottom bracket 10, a crankset 5, and a chainwheel 17.

The bottom bracket 10 is fixed with respect to the cycle frame and is constituted by a main body 11 centered about a first axis A1, and by a secondary body 12 centered about a second axis A2, the second axis A2 being parallel but not merged, or coincident with, the first axis A1.

The crankset 5 is mounted by means of a crankset shaft 13 inside the main body 11. The cranks 24, each provided to receive a pedal 23, are also fixed on the crankset shaft (only the right crank 24 is depicted in FIG. 2).

The crankset 5 further includes a first toothed element 15, centered on the axis A1, and a second toothed element 16, also centered on the axis A1. The first toothed element 15 and the second toothed element 16 are each made in the form of a crown with radially internal teeth.

The chainwheel 17 is rotationally mounted along the second axis A2 relative to the secondary body 12 via a central hub 18. It further includes a third toothed element 20 centered on the axis A2, and a fourth toothed element 21 also centered on the axis A2. The third toothed element 20 and the second toothed element 21 are both made in the form of sprockets with radially external teeth.

The first and third toothed elements 15, 20 are in constant respective engagement, and the second and fourth toothed elements 16, 21, are in constant respective engagement, as depicted in FIG. 2.

Given that the first and second toothed elements 15, 16 are constituted by elements with radially internal teeth, it is possible for the third and fourth toothed elements to be housed in the first and second toothed elements. Thus, the axis A2 is offset relative to the axis A1 by a limited value, in any case by a value that is less than the radius of the largest of the toothed elements. This cannot be the case in a conventional gear box, in which all the toothed elements have external teeth. This arrangement allows for a more compact construction.

Furthermore, as a consequence of the internal teeth/external teeth combination, the output shaft of the transmission device, i.e., the chainwheel, turns in the same direction as the input shaft, i.e., as the crankset 5.

For a better understanding, the right side of the FIG. 2 schematic, in a front view, shows the primary diameters of the first and third toothed elements 15, 20 in solid lines, and those of the second and fourth toothed elements 16, 21 in broken lines.

A toothed ring 19, centered on the second axis A2 and fixed on the chainwheel 17, is capable of cooperating with the transmission chain connecting the pedaling zone to a rear sprocket of the rear wheel.

A disengageable blocking device 22 is provided to block, alternatively, the rotation of the first toothed element 15 with respect to the crankset 5, the second toothed element 16 remaining free to turn, or the rotation of the second toothed element 16 with respect to the crankset, the first toothed element remaining free to turn.

Such a transmission system allows for two transmission ratios in the area of the crankset. The first ratio, called the "small ratio" hereinafter, is obtained when the rotation of the first toothed element 15 is rotationally blocked with respect to the crankset. The transmission ratio is then equal to the quotient of the number of teeth of the first toothed element 15 divided by the number of teeth of the third toothed element 20. The second ratio, called the "large ratio" is obtained when the rotation of the second toothed element 16 is rotationally blocked with respect to the crankset 5. The transmission ratio is then equal to the quotient of the number of teeth of the second toothed element 16 divided by the number of teeth of the fourth toothed element 21.

The transmission device according to the invention is not limited to two transmission ratios in the area of the crankset. Indeed, the device can include additional toothed elements in order to have a third, fourth, etc., gear train.

In an alternative embodiment not shown, the blocking device is not provided to block the rotation of the first and second toothed elements but rather to block the rotation of the third 20 and fourth 21 toothed elements with respect to the chainwheel 17. The first and second toothed elements 15 and 16 would then be affixed to the crankset. Also encompassed by the invention is the blocking of the rotation of one toothed element with respect to the chainwheel 17 and of one toothed element with respect to the crankset 5.

Figure 3:
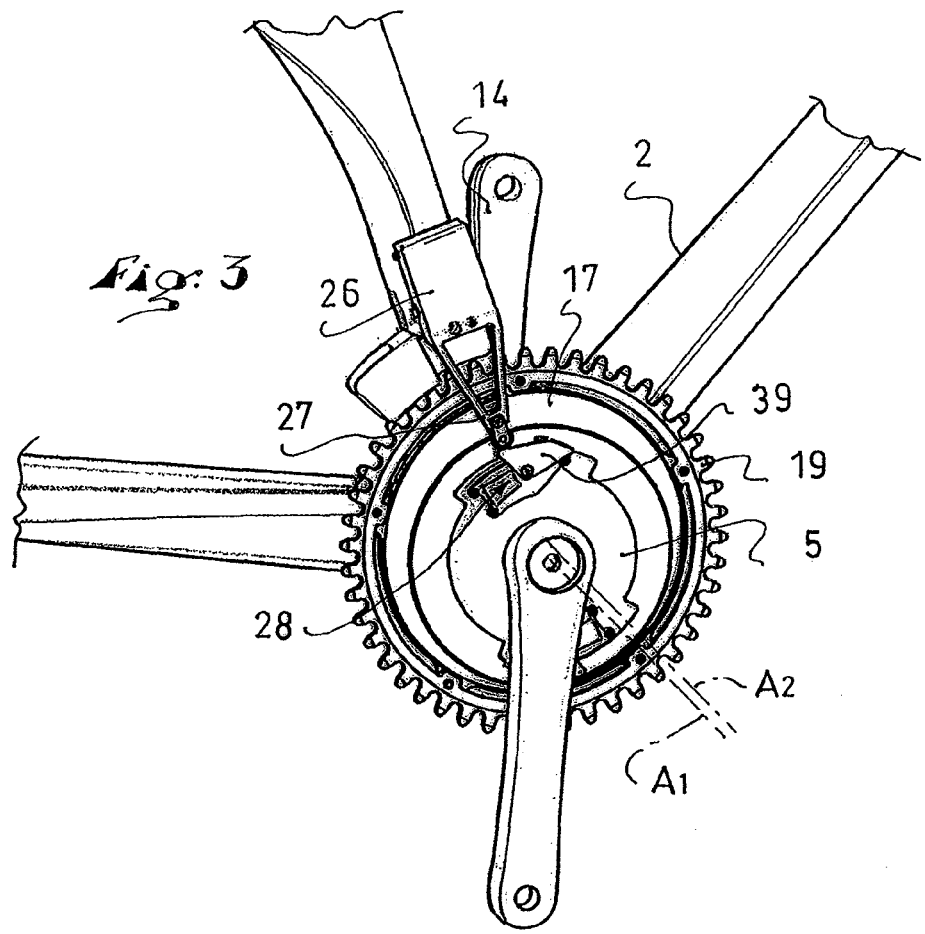
FIG. 3 is a right side view of the first embodiment.

FIG. 3 is a partial view of a bicycle according to the first embodiment of the invention, which shows a portion of the frame 2 as well as a portion of the transmission device. The chain 6 and the pedals are not shown.

The transmission device includes a crankset 5, a chainwheel 17, an actuating mechanism fixed on the crankset 5, as well as a control device 26.

The control device 26 makes it possible to change the transmission ratios. The control device 26 is fixed on the seat tube of the frame 2 and includes a downwardly extending arm 27 that cooperates with cams 39 that are part of the actuating mechanism 28.

The crankset 5 is a first subassembly that is rotationally mounted relative to the frame 2 along a first axis A1. It includes a shaft 13 at the ends of which two grooved cylindrical zones are arranged. The crankset also includes two cranks and a plate 9. The left grooved end of the shaft 13 serves to fix the left crank 24. In the remainder of this disclosure, the adjectives "right" and "left" refer to the direction of advance of the cycle. The right grooved end of the shaft serves to affix the plate 9 and the right crank 14 (see FIGS. 5 and 6).

The chainwheel 17 constitutes a second subassembly that is rotationally mounted relative to the frame 2 along a second axis A2, which is parallel to but distinct from the first axis A1. The distance separating the two axes A1 and A2 is referred to as the eccentricity E. In the first embodiment, an eccentricity ranging between 6 mm and 11 mm is selected. In a particular exemplary embodiment, the eccentricity can equal 7.5 mm.

The chainwheel 17 comprises a toothed ring 19 on, or fixed to, its periphery. The toothed ring is provided to cooperate with the transmission chain 6 (FIG. 1). The toothed ring 19 has a circular shape, whose center coincides with the axis A2. Thus, when the chainwheel 17 is rotationally driven by the crankset 5, the toothed ring 19 turns about the axis A2. The ring 19 can also have a shape that is not strictly circular, such as an elliptical shape, for example.

In the illustrated embodiment, the axis A2 is positioned higher than the axis A1. Thus, the ground clearance, i.e., the distance separating the lowest point of the ring 19 from the ground, is improved with respect to a bicycle having a conventional transmission device.

Figure 4:
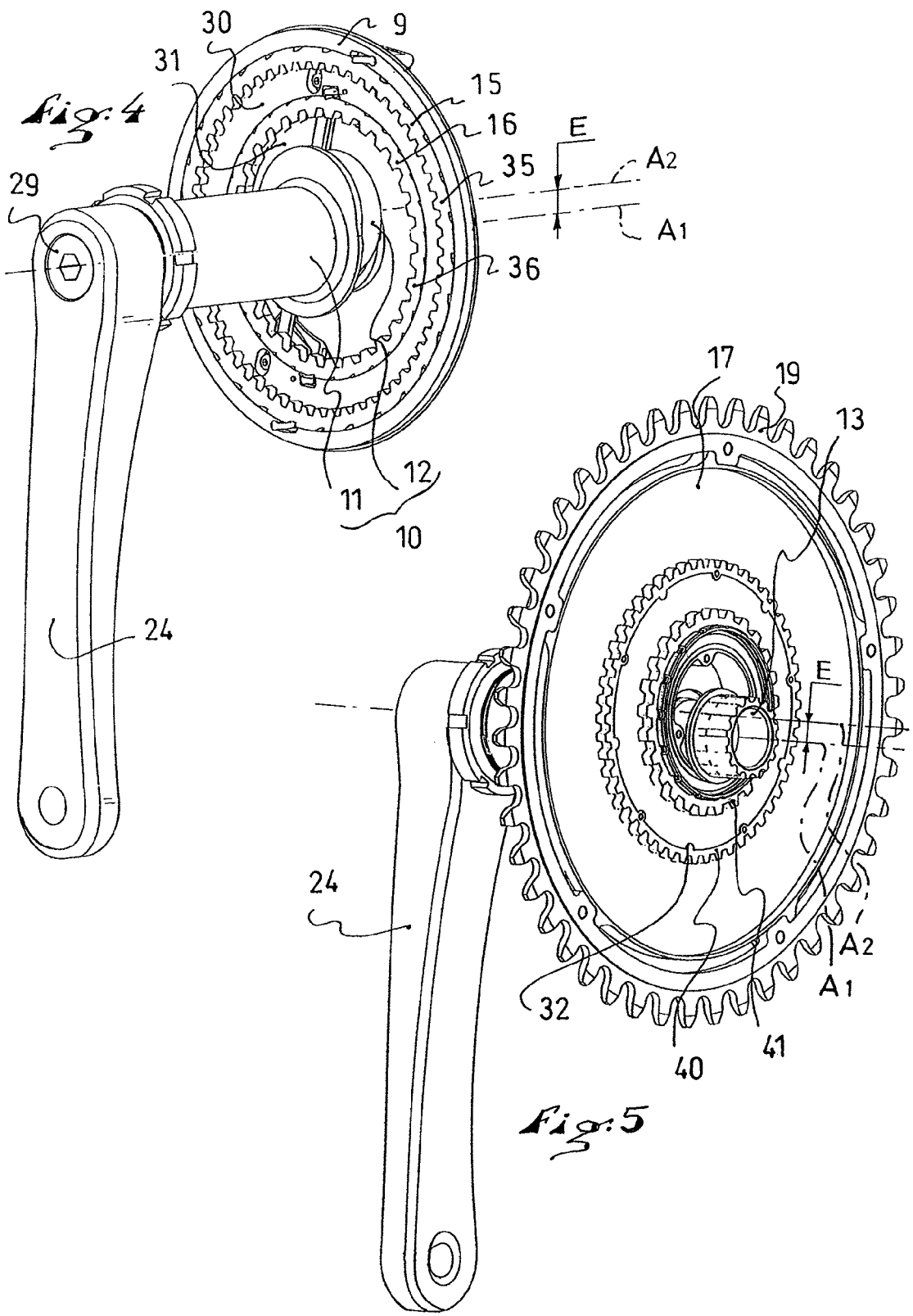
FIG. 4 is a partial left side view of the first embodiment.

FIG. 4 is a (¾ left) perspective view of the bottom bracket 10 and the first subassembly constituted by the crankset 5. The bottom bracket 10 includes a main body 11 and a secondary body 12. The main body 11 corresponds to a conventional bottom bracket. It is a cylindrical sleeve that is inserted in a correspondingly shaped opening provided in the frame 2. The secondary body 12 is positioned in the continuity of the main body, on the right side thereof. The outer contours of the secondary body 12 assume the shape of a cylindrical metal disc whose axis is parallel to, but offset by a value E from, the axis of the main body 11.

The shaft 13 of the crankset 5 is mounted inside the bottom bracket 10 in a known manner by means of rolling bearings (schematically depicted in FIG. 5a). The grooved ends of the shaft 13 overlap the bottom bracket 10 on both sides and serve to rotationally affix the cranks 14, 24 and the plate 9. The left crank 24, shown in FIG. 4, is fixed on the shaft 13 in a known manner by means of the screw 29. The right crank 14, shown in FIG. 3, is also fixed by means of a screw. The plate 9 is sandwiched between a shoulder provided on the shaft 13 and the right crank 14.

As shown in FIG. 4, the plate 9 includes, on its left surface, a large circular cup 30 that is centered on the axis A1 and has a diameter slightly less than the outer diameter of the plate 9. A small circular cup 31, centered on the axis A1, is provided at the bottom of the large cup.

The first toothed element 15 and second toothed element 16 are received inside the large cup 30 and small cup 31, respectively. In this embodiment of the invention, the first toothed element 15 and second toothed element 16 take the shape of a large toothed crown 35 and of a small toothed crown 36, respectively. In the remainder of this disclosure of the first embodiment, reference is only made to large and small crowns.

The large and small crowns 35, 36 are rotationally free with respect to the plate 9; they are stopped in axial translation by the bottom of the cups, on the one hand, and, as will be seen hereinafter, by the right surface of the chainwheel 17, on the other hand.

According to the invention, a disengageable blocking device 22 is provided to block the rotation of the large crown 35 or of the small crown 36 with respect to the plate 9, i.e., with respect to the crankset 5.

Figure 5:
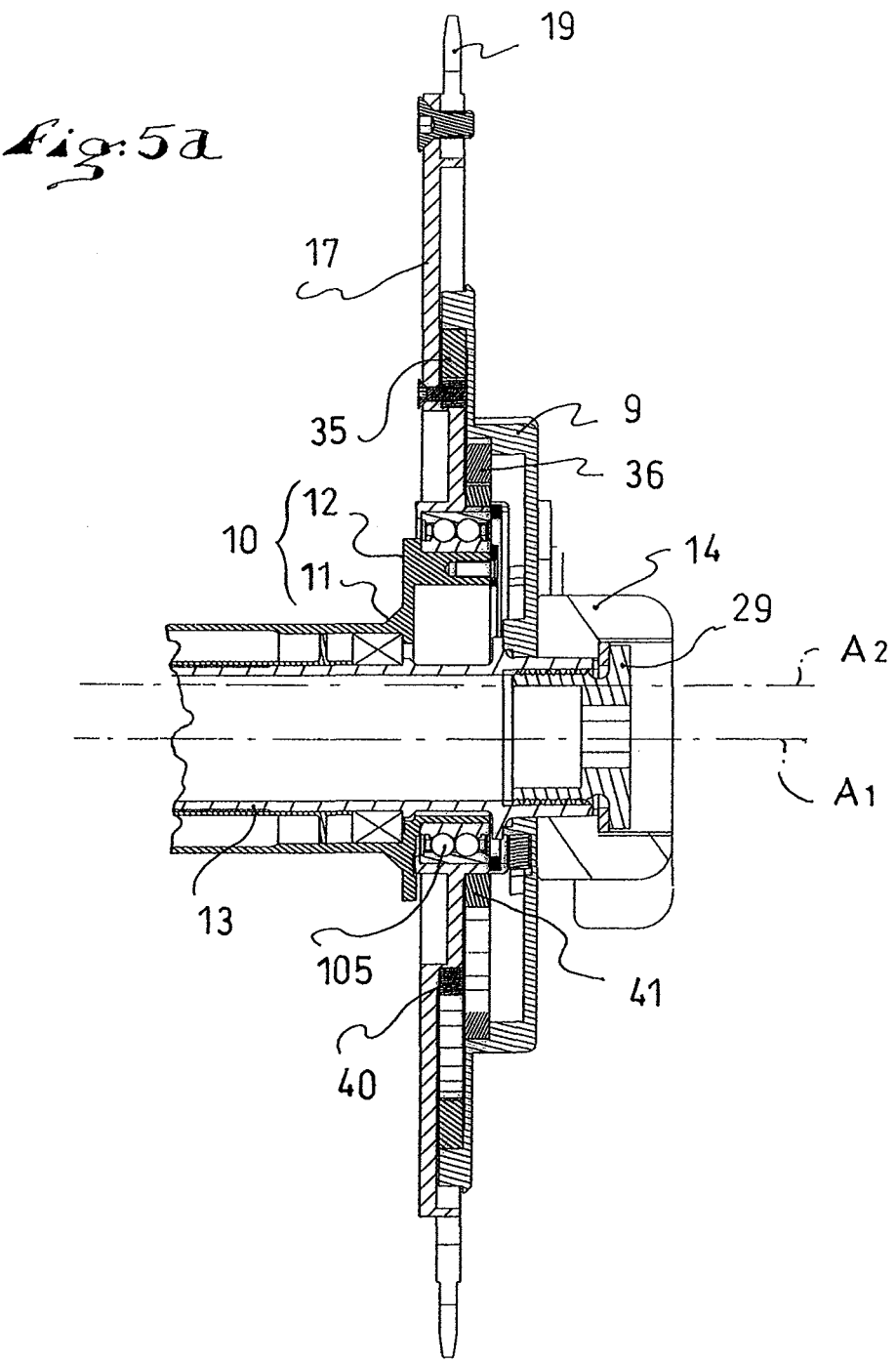
FIG. 5 is a partial right side view of the first embodiment.

FIG. 5 shows a perspective right side view of the second subassembly constituted by the chainwheel 17. The chainwheel has the shape of a circular disc centered on the axis A2. A bore is provided in the center of the chainwheel 17 to receive the outer ring of a rolling bearing, the inner ring of which is inserted on outer surface of the secondary body 12.

A toothed ring 19 is fixed on the outer perimeter of the chainwheel 17 by means of five fastening screws (see FIG. 5a). The toothed ring 19 receives the transmission chain.

The right surface of the chainwheel 17, the surface that is opposite the left surface of the plate 9, includes a first large diameter shoulder, against which the third toothed element 20 is fixed, and a second a smaller diameter shoulder against which the fourth toothed element 21 is fixed.

In this embodiment of the invention, the third toothed element 20 and fourth toothed element 21 (schematically depicted in FIG. 2) assume the shape of a large toothed sprocket 40 and of a small toothed sprocket 41, respectively.

As shown in FIG. 5, e.g., the large and small sprockets 40, 41 have on their inner perimeters a plurality of semi-circular or crescent shapes 32, which become embedded in correspondingly shaped cavities provided in the shoulders of the chainwheel 17, in order to affix them rotationally with the chainwheel. The large sprocket 40 is stopped in translation by fastening screws. The small sprocket 41 is stopped by a circlip which also serves to block the outer ring of the bearing of the chainwheel 17. A double row ball bearing 105 is used for a better support of lateral forces. Particular reference is made to the cross-sectional view of FIG. 5a for a better understanding of the assembly.

The two crowns 35, 36 and the two sprockets 40, 41 can be made of steel, titanium, or alloy, for example, or other material.

Figure 6:
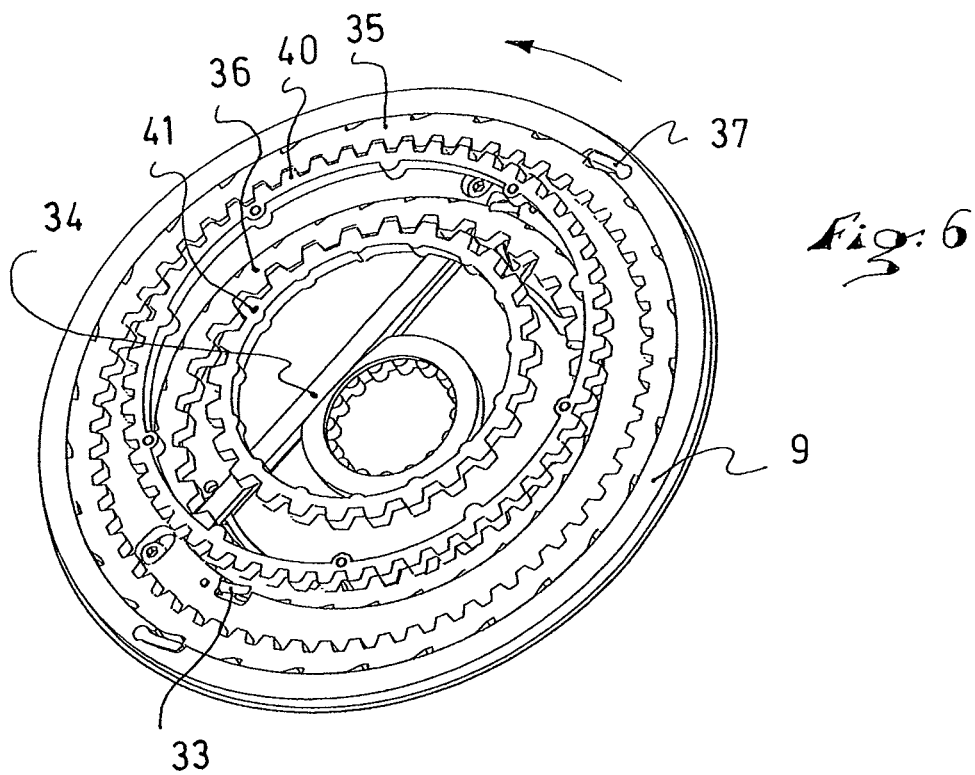
FIG. 6 is a perspective view showing the two gear trains of the first embodiment.

FIG. 6 primarily shows, in a perspective left side view of the plate 9, the crowns 35, 36 and the sprockets 40, 41. The large crown 35 and large sprocket 40 are structured and arranged to mesh together and constitute the first gear train, whereas the small crown 36 and small sprocket 41 mesh together and constitute the second gear train.

The primary radii of the first, second, third, and fourth gears are R1, R2, R3, R4, respectively; the number of their teeth are Z1, Z2, Z3 and Z4, respectively; the transmission ratios of the first and second gear trains are k1=Z1/Z3, k2=Z2/Z4, respectively; and the modules of the first and second gear trains are called m1, m2, respectively.

In view of the geometrical arrangement of the sprockets and of the crowns, the differences "R1−R3" and "R2−R4" are equal to the value of the eccentricity E.

In the first embodiment of the invention, the modules m1 and m2 are selected such that the quotient Q of the transmission ratios k1 and k2 (Q=k2/k1) is close to 1, and can be within a range of between 1.06 and 1.08, or within a range of between approximately 1.06 and approximately 1.08.

In the example described here, a module m1 of 1.875 mm and a module m2 equal to 2.5 mm are selected for primary radii R1 and R2 of the two crowns equal to 54.4 mm and 38.8 mm, and primary radii of the sprockets equal to 46.9 mm and 31.3 mm. Consequently, the large crown 35 includes Z1=58 teeth and the small crown 36 includes Z2=31 teeth, whereas the large sprocket 40 includes Z3=50 teeth and the small sprocket 41 includes Z4=25 teeth. Under these conditions, the transmission ratio of the $1^{st}$ gear train is k1=1.16; that of the $2^{nd}$ gear train is k2=1.24, and the quotient Q is approximately 1.07.

All of the preceding values constitute particularly advantageous choices for making a transmission device according to the invention. They are shown in Table 2 below.

TABLE 2

| | | Crankset | Chainwheel |
|---|---|---|---|
| | | $1^{st}$ toothed element (large crown) | $3^{rd}$ toothed element (large sprocket) |
| "Small ratio" | Radius | $R_1$ = 54.375 mm | $R_3$ = 46.875 mm |
| | Number of teeth | $Z_1$ = 58 | $Z_3$ = 50 |
| | Module | $m_1$ = 1.875 mm | |
| | Transmission ratio | $K_1$ = 58/50 = 1.16 | |
| | Freewheel notches | $N_1$ = 29 | |
| | | $2^{nd}$ toothed element (small crown) | $4^{th}$ toothed element (small sprocket) |
| "Large ratio" | Radius | $R_2$ = 38.75 mm | $R_4$ = 31.25 mm |
| | Number of teeth | $Z_2$ = 31 | $Z_4$ = 25 |
| | Module | $m_2$ = 2.5 mm | |
| | Transmission ratio | $K_2$ = 31/25 = 1.24 | |
| | Freewheel notches | $N_2$ = 31 | |
| Quotient of the transmission ratios | | Q = K2/K1 = (31 × 50)/(25 × 58) = 31/29 = N2/N1 | |

Figure 7:
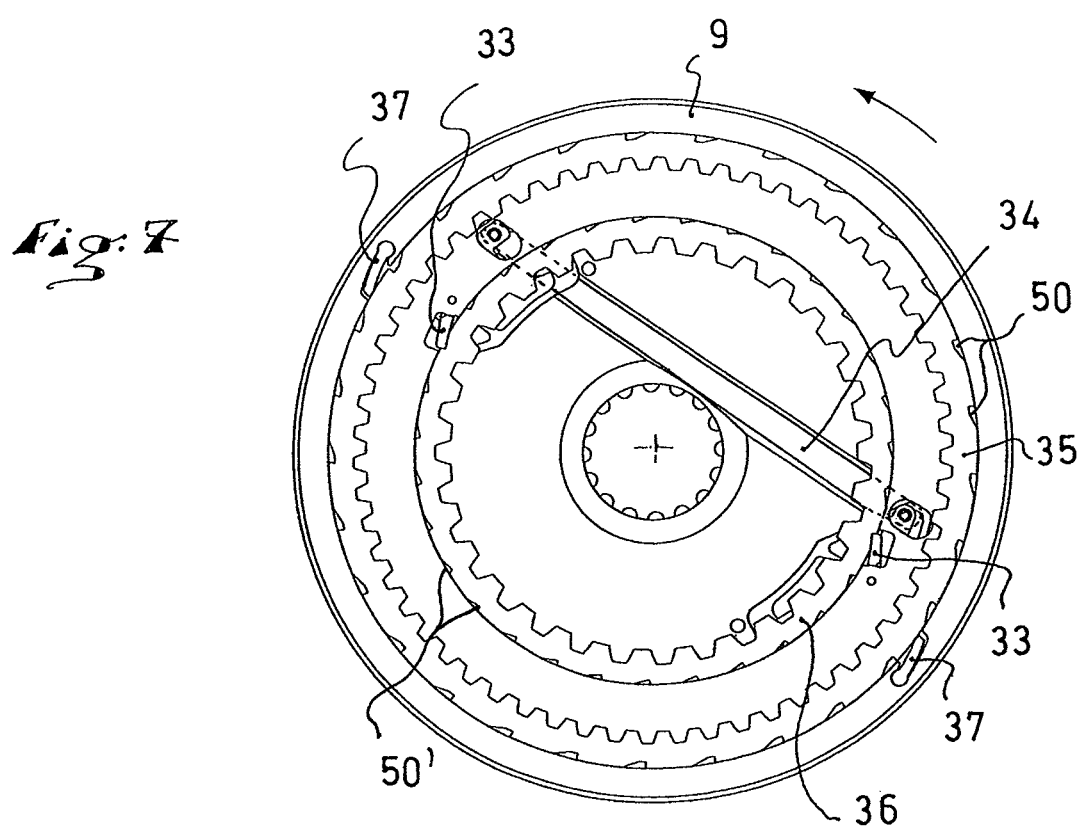
FIGS. 7 and 8 are left side views of the plate and of the crowns according to the first embodiment.
Figure 8:
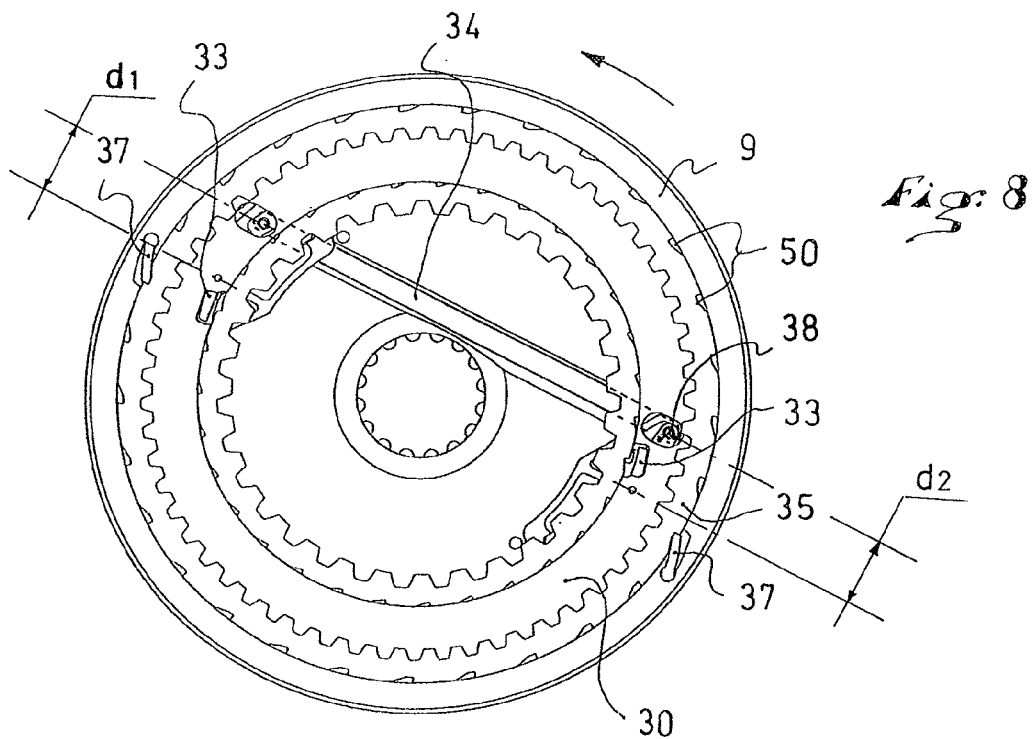

According to the invention, the transmission device also includes a disengageable device 22, or blocking device (schematically depicted in FIG. 2) for the selective blocking of the large crown 35 or of the small crown 36 with respect to the plate 9 of the crankset 5. The blocking device 22, in this embodiment, is manifested by the cooperation of several pawls with notches provided on the circumference of the crowns 35, 36. More specifically, and as can be seen in FIGS. 7 and 8, the blocking device 22 includes two controlled pawls 33 and two free pawls 37. The controlled pawls 33 serve to block the rotation of the small crown 36, and the free pawls 37 to block rotation of the large crown 35.

The blocking device 22 enables the two gear trains to be connected to and disconnected from the crankset. To have a completely exclusive operation, when one of the gear trains is connected, i.e., the large crown or the small crown, respectively, is blocked, then the other must be disconnected, i.e., the small crown or the large crown, respectively, must be in freewheel.

In the particular embodiment described and illustrated here, the disengageable blocking device, i.e., freewheels, are positioned between the crowns 35, 36 and the crankset 5. This is only one choice related to the options retained for the integration. Indeed, it could have been possible to fix the crowns 35, 36 opposite the crankset 5 and to provide a disengageable blocking device between the sprockets 40, 41 and the chainwheel 17.

As in a rear hub freewheel, the pawls used enable the unidirectional rotation of the crowns with respect to the crankset in the pedaling direction. The pedaling direction is represented in FIGS. 7 and 8 by means of an arrow indicating a counter-clockwise direction. In this direction, the crankset 5 is capable of driving the crowns 35, 36, whereas the crankset cannot do so in the reverse direction.

As can be seen, the freewheel function necessary for a cycle transmission device is ensured by the crankset/chainwheel assembly. Only two fixed sprockets, therefore, need be mounted on the driving wheel.

The free pawls 37 function in the manner of a pawl used in bicycle wheel hub having a freewheel. They are comprised of a cylindrical portion and of an end arm. The cylindrical portion is received in a complementarily shaped recess provided in the plate 9, in the vicinity of the edges of the large cup 30 in which the large crown 35 is positioned, thus defining a pivoting axis for the pawl. The end arm is received in a cavity of the plate that is sufficiently large so that it has the freedom to pivot between a blocking position and a retracted position. In the blocking position (FIG. 8), the end arm projects from the cavity until it penetrates into one of the notches 50 provided on the large crown 35. In the retracted position (FIG. 7), it is entirely contained in the cavity and does not block the rotation of the large crown with respect to the plate 9. A spring (not shown) automatically returns the end arm of the pawl to the blocking position.

In order to balance the forces transmitted between the plate 9 and the large crown 35, two free pawls 37 are arranged on the plate, in respective positions that are substantially diametrically opposite one another. Given that it is desirable for the two free pawls 37 to be simultaneously engaged in the notches 50, their positioning with respect to one another is dependent upon the number of notches. If the number of notches is an even number, the notches can be positioned diametrically. On the other hand, if there is an odd number of notches, an offset will occur.

Similarly, two controlled pawls 33 are arranged on the plate 9 in order to block the rotation of the small crown 36. In this case, the two controlled pawls 33 are synchronized with one another by means of a rod 34. Each of the controlled pawls 33 is associated with an actuating mechanism 28 which is described in detail in the description below in connection with FIGS. 9, 10, and 11.

Figure 9:
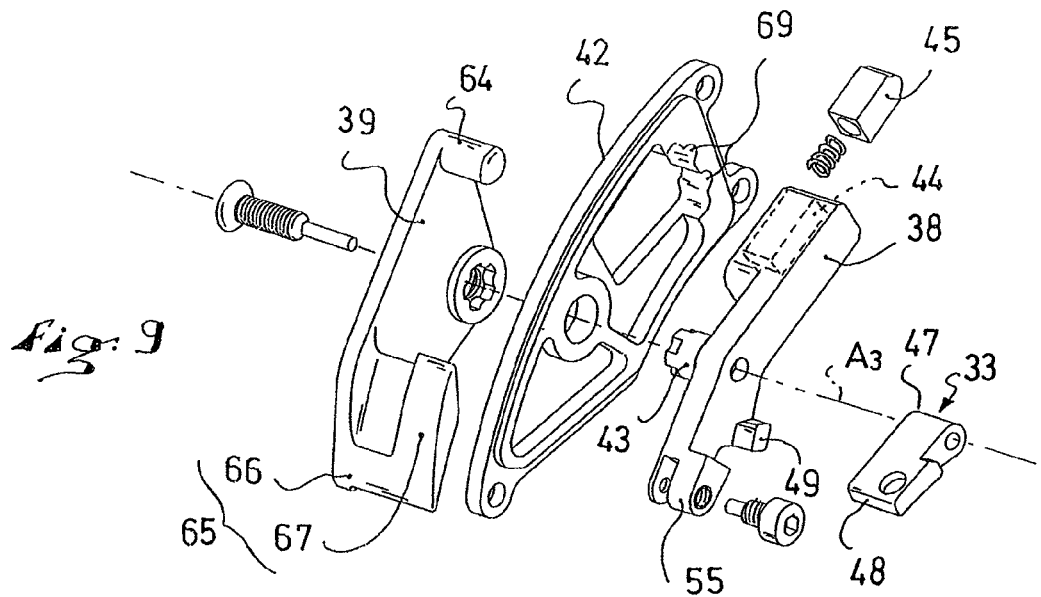
FIG. 9 is an exploded perspective view of an actuating mechanism.

FIG. 9 illustrates, in an exploded perspective view, the elements constituting the actuating mechanism 28.

The actuating mechanism 28 includes a finger 38 and a cam 39. The finger 38 is received in a housing of the plate 9, which opens mainly on the right surface of the plate. The housing is closed by a cover 42 that is fixed to the plate 9 by means of three screws (see FIG. 3).

The cam 39 includes an essentially triangular plate defining three pointed tips. The first of these pointed tips is pierced with a cylindrical hole comprising grooves. The other two pointed tips each comprise a lug 64, 65.

The cover 42 is pierced with a cylindrical hole in which is inserted a hollow cylindrical stud 43 extending from the right side of the finger 38. Grooves are provided at the end of the stud 43. The grooves of the cam 39 and those of the finger 38 are complementary, and when they are engaged in one another, they ensure that the cam and the finger are rotationally connected to both sides of the cover. A screw whose head takes support on the cam, and which is screwed into the stud 43, completes the attachment of the cam, finger, and cover 42, the cam and the finger being actuated by a pivoting movement with respect to the cover about an axis A3.

The end of the screw also makes the pivoting connection of the controlled pawl 33 and of the finger. Furthermore, so that the forces of the crown on the controlled pawl 33 do not only pass in the screw, and then in the finger, the controlled pawl 33 is also received in a housing provided in the plate 9.

The finger 38 also includes a chamber 44 in which a piston 45 can slide. The head of the piston is capable of being indexed in two notches, when the piston is maintained in the projecting position. A spring maintains the piston in the projecting position. The two notches 69 make it possible to define two stable positions in the rotational movement of the finger, which are referred to as the high position and the low position.

The controlled pawl 33 includes a base 47 and an arm 48. The base of the controlled pawl 33 is pivotally mounted with respect to the finger 33 about the same axis A3. Thus, the arm 48 is capable of pivoting between an engaged position (FIG. 7), in which the arm engages in one of the notches 50' of the small crown 36, and a released position (FIG. 8), in which the arm does not block the rotation of the small crown 36 with respect to the plate 9. A spring (not shown) forces the controlled pawl 33 into the engaged position.

The finger 38 also includes a projecting member 49, or tab, positioned under a portion of the arm 48 of the controlled pawl 33, under the right portion. The positioning of the tab 49 is such that when the finger 38 is in the low position (FIG. 7), the tab does not prevent the rotation of the controlled pawl in the direction imposed by the spring until the arm 48 becomes embedded in one of the notches 50' of the small crown 36. On the other hand, when the finger moves in the high position (FIG. 8), the tab 49 raises the arm 48 sufficiently so that the latter is no longer engaged in the notches 50' and, consequently, no longer blocks the rotational movement of the small crown 36 with respect to the plate 9.

The finger 38 also includes a pair of flanges 55 that fix the rod 34, provided to synchronize the two actuating mechanisms 28, with one another. The position of the connecting flanges is not the same on the two fingers 38. Indeed, although the two actuating mechanisms are substantially diametrically opposite, the rod 34 connecting them must not pass through the central portion of the plate 9. Instead, it must be positioned to pass beside the shaft and such that the angular rotation of the two fingers is substantially the same in terms of value and rotational direction. It is therefore desirable for the two dimensions d1 and d2 of FIG. 8 to be very close.

The passage of the finger 38 from the low position to the high position, and vice versa, is ensured by the cooperation of the two lugs 64, 65 borne by the cam 39 and of the arm 27 of the control device 26.

The two lugs 64, 65 are located at the same distance from the axis A3. However, they have neither the same shape nor the same height with respect to the cam 39. The first lug 64 has a simple shape, and it is lesser in height of the two, i.e., it does not extend as far from the cam 39. The second lug 65 includes a lower part 66 having a height at least equal to that of the first lug 64, and an upper part 67, or head, having a rolling surface. As explained hereinafter, the lower part 66 of the second lug 65 is set back relative to the head 67 along a radial direction with respect the axis A3.

The control device 26 includes a base 51, which is fixed on the seat tube of the frame in a known manner by means of a collar 53 (see FIGS. 11 and 14), a motor 52 immobilized on flanges 55 extending from the base 51, and a cover 56.

The cover 56 is connected to the base 51 with the possibility of pivoting with respect to the base about an axis A4 contained in a plane parallel to the planes of the crankset 5 and of the chainwheel 17. To provide such pivoting, the base 51 includes two vertical members 54 in its upper portion, each of the two vertical members 54 containing through-holes extending along the axis A4. The two walls 73 of the cover 56 also include through-holes in their upper portions along the axis A4. A pin 57, inserted in the four holes, provides the pivotal assembly for the cover 56 relative to the base 51.

The pivoting movement of the cover 56 is actuated by means of the motor 52. A connecting rod 58 is fixed on the output shaft of thereof; the end of the connecting rod is offset by approximately 6 mm. A slide 59 is pivotally mounted at the end of the connecting rod 58.

The slide 59 is received in a sliding rail 60 provided in a wall 73 of the cover 56. Thus, the rotation of the connecting rod 58 actuated by the motor causes the cover 56 to pivot between a first position, referred to as the deployed position, and a second position, referred to as the retracted position.

The retracted and deployed positions are precisely indexed due to appropriately structured and positioned abutting screws.

A first abutting screw 61, screwed into the cover 56, takes support on the base 51 when the cover is in the retracted position. A pressure screw prevents the screw from loosening (see FIG. 14).

A second abutting screw 62, having a cylindrical head, is screwed into the base 51, with a counter-nut that keeps the head at a certain distance from the base 51. This second abutting screw 62 is received in a shouldered hole provided in the cover 56. When the cover is in the deployed position, the head of the second abutting screw 62 is in support on the shoulder of the cover 56, preventing the cover from deploying further (see FIG. 11).

The cover 56 further includes a downwardly directed arm 27, at the lower end of which a roller 63 is mounted. The roller 63 is provided to come in contact, selectively, with one of the two lugs 64, 65 borne by the cam 39.

Given that the roller 63 can assume either of two positions, and because of the rotation of the crankset 5, the roller 63 is selectively on either a first circular trajectory 71 or on a second circular trajectory 72, in the frame of reference of the crankset.

These two circular trajectories have substantially the same diameter and are centered on the axis A1 of the crankset. On the other hand, they are positioned in two parallel planes with respect to the plane of the chainwheel 17.

As explained above, that the two lugs 64, 65 have neither the same height nor the same shape. The shapes and heights are selected such that that when the cover 56 is in the retracted position (FIG. 13 and FIG. 14), the roller 63 is on the first circular trajectory 71, on which it cannot in any case be in contact with the first lug 64 because of the small height of the first lug 64. It can, however, come in contact with the head 67 of the second lug 65.

On the other hand, when the cover 56 is in the deployed position (FIG. 10 and FIG. 11), the roller 63 is on the second trajectory 72, on which it is capable of coming in contact with the first lug 64, but cannot come in contact with the second lug 65 because the lower part 66 is set back with respect to the head 67.

Another factor taken into account to determine the possible contact between the roller 63 and the lugs is the position of the cam 39. When the cam is in the low position (FIGS. 10, 11, and 12), the first lug 64 is beyond the diameter of the circular trajectories, whereas the second lug 65 is within the diameters of the circular trajectories. Thus, when the cam 39 is in this low position, only the first lug 64 is capable of being contacted by the roller.

In the high position of the cam 39 (FIGS. 13, 14, and 15), the reverse occurs and only the second lug 65 is capable of coming in contact with the roller 63.

The functioning of the control device and of the blocking device will now be described in detail starting from the stable state in which the second gear train is connected, i.e., in which the crankset is on the second transmission ratio, namely the "large ratio" (see FIG. 7).

In this state, the small crown 36 is blocked with respect to the crankset 5 by means of the controlled pawls 37. To this end, the finger 38 and the cam 39 must be in the low position (FIGS. 7 and 10), so that the tab 49 does not prevent the controlled pawl 33 from moving down into one of the notches 50' of the small crown.

The torque applied to the crankset by the cyclist is transmitted to the chainwheel via the small sprocket 41. Because the small sprocket 41 and the large sprocket 40 are affixed to the chainwheel, these three elements turn together at a speed 1.24 times faster than that of the crankset (Z2/Z4).

The large crown 35, which is in engagement with the large sprocket 40, is driven by the large sprocket with respect thereto at a relative speed that is equal to the ratio between the teeth of the large sprocket and of the large crown (Z3/Z1). It is therefore in free rotation with respect to the crankset 5 at a speed equal to (Z2×Z3)/(Z4×Z1) which, in this example, is equal to 1.07 times the speed of the crankset. Consequently, the free pawl 37 cannot become blocked in one of the notches of the large crown 35. As a result, the two free pawls 37 function in the manner of the pawls found in freewheel hubs, i.e., they oscillate, enter into and then exit from the notches 50 of the large crown 35.

In this stable state, the cam 39 is in the low position and the roller 63 travels through the first circular trajectory 71, corresponding to the retracted position of the cover 56. Consequently, during the rotation of the crankset, the roller 63 does not come into contact with either of the two lugs 64, 65.

Figure 10:
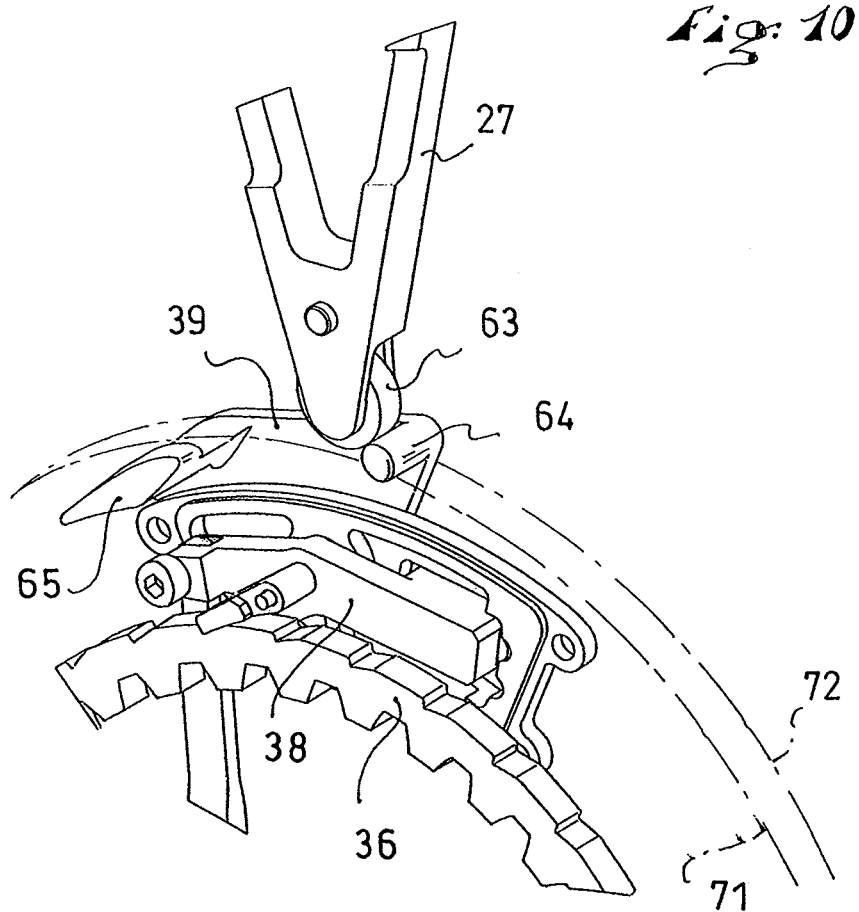
FIGS. 10, 11, and 12 are partial perspective views of the device, while the device is in a first state.
Figure 11:
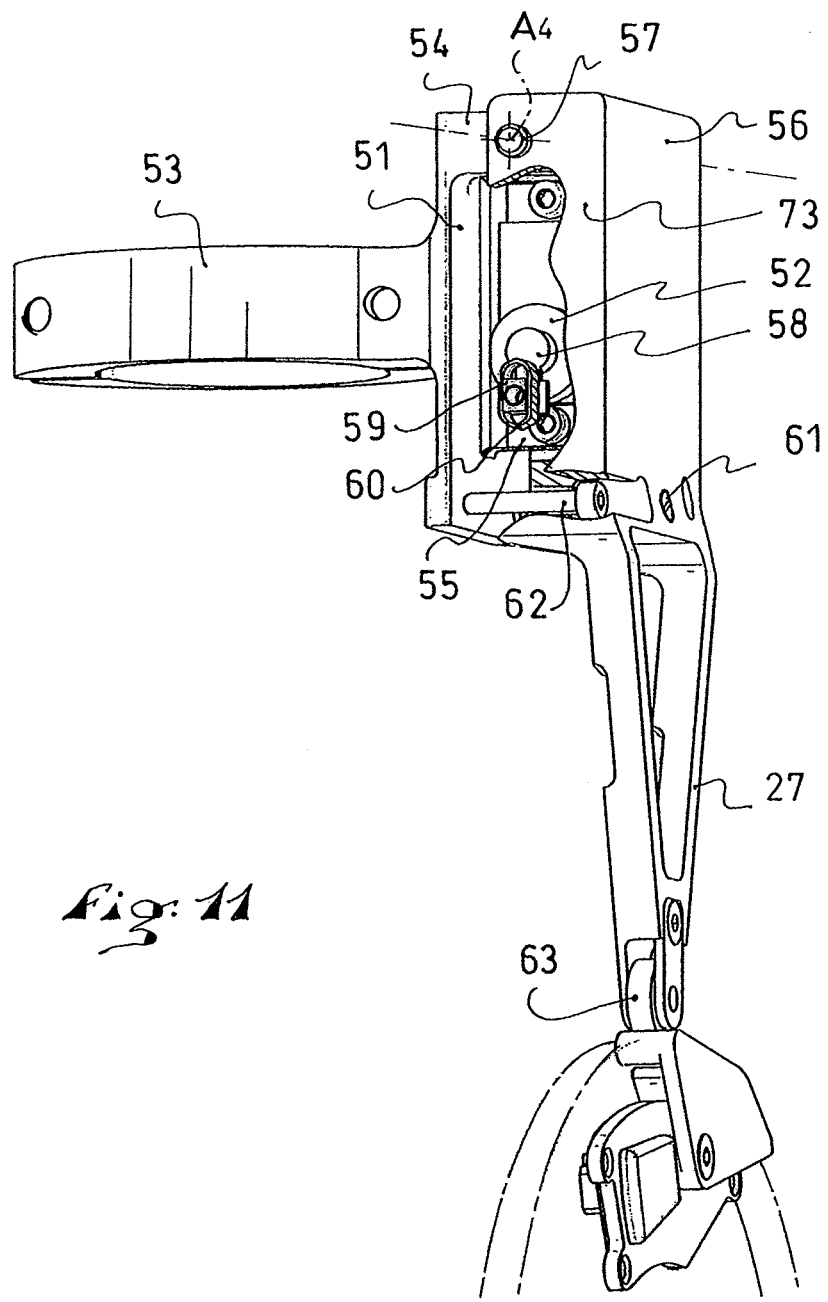
Figure 12:
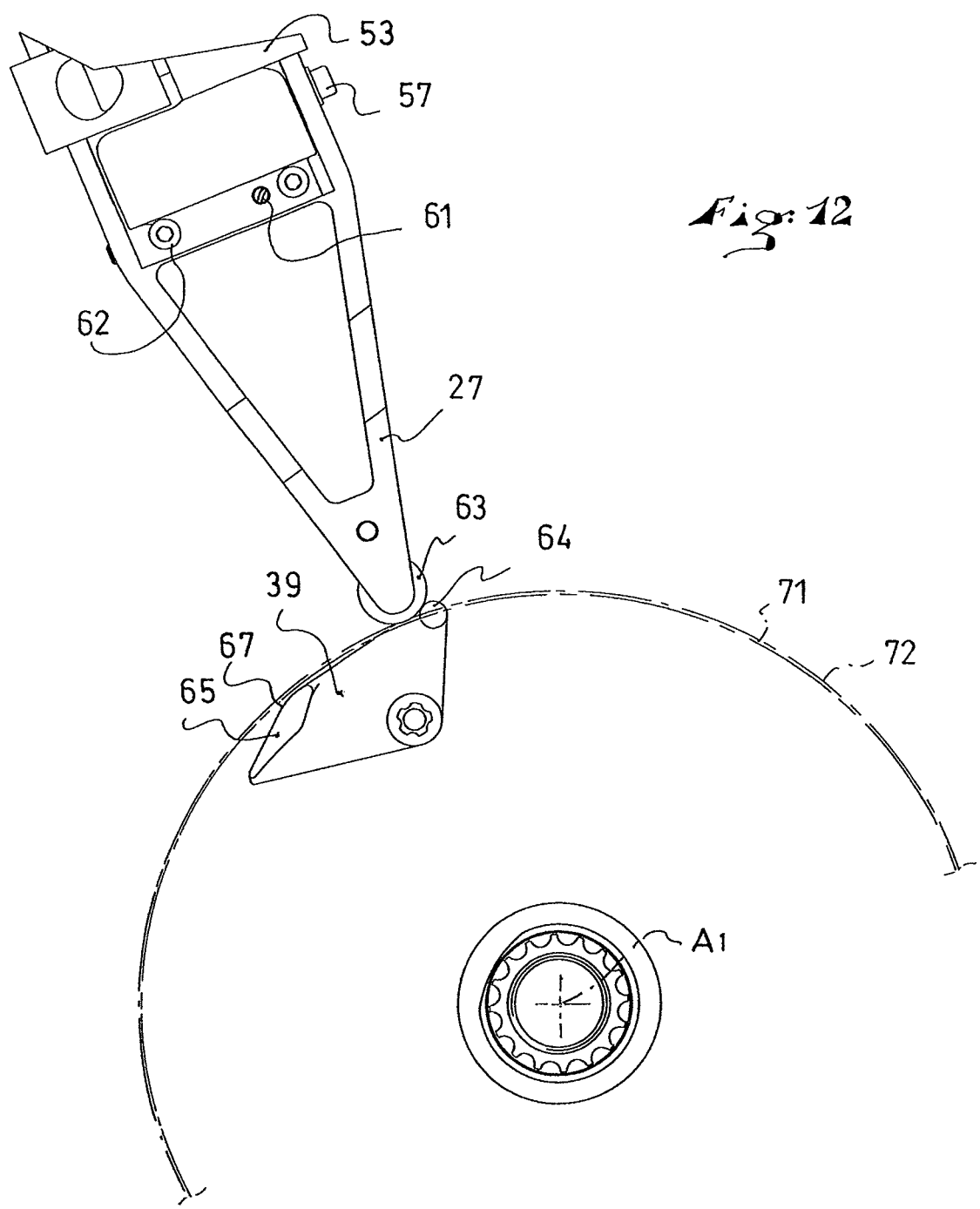

Starting from this state, while the cyclist is pedaling and a command to change the transmission ratio is issued, the control/command device 70 subjects the motor 52 to a tension, in order to generate its rotation. The rotation of the motor, by means of the rod 58 and of the slide 59, brings the cover 56 into the deployed position. The roller 63 is then set to travel through the second circular trajectory 72. At a certain moment during the rotation of the crankset, the roller 63 meets the first lug 64. It is this exact moment that is shown in FIGS. 10, 11, and 12.

To be able to continue the rotation of the crankset 5, the roller 63 exerts a force on the first lug 64 which causes the cam 39 to pivot so as to pass the lug 64 to within the diameter of the circular trajectories. In doing so, it causes the cam 39 and the finger 38 to move to the high position.

As described hereinabove, during the rotation of the cam 39 towards its high position, the tab 49 engages the controlled pawl 33 so as to raise it and withdraw it from the particular notch 50' of the small crown 36 in which it had been positioned.

At this moment, i.e., upon the withdrawal of the control pawl 33 from its notch, there is no transmission of torque from the crankset 5 to the chainwheel 17 through the second gear train because the small crown is disengaged (free to turn) with respect to the crankset. Transmission of the torque through the first gear train has not yet occurred.

In this intermediate phase, the crankset turns in the pedaling direction, but the chainwheel 17, along with the sprockets which are affixed thereto, but also the crowns, which are loose, turn less quickly than the crankset.

The speed differential between the crankset 5 and the large crown 36 moves the large crown backward with respect to the crankset. In this backward movement, the free pawls 37, biased by their respective springs, penetrate into the first notch 50 that is in their path and become blocked therein. To reduce this intermediate phase to a minimum duration, and to prevent the position of the crowns 35 and 36 from being random with respect to the position of the crankset 5 at the time of the change of transmission ratio, it must be ensured that N2/N1=Q in order to have a complete synchronization. This condition is achieved for N1=29 teeth and N2=31 teeth. Thus, irrespective of the notch whose pawl 33 has just been released, from among the possible 31 designated by the reference numeral 50', the pair of pawls 37 will be ready to engage within the notches 50. This condition makes it possible to have a smooth and barely perceptible transition, whereas in the opposite case, the transition would be random and could cause substantial impacts at the time the pawls 37 engage into the notches 50 of the large crown.

To facilitate the positioning of the gear trains during assembly, in a particular embodiment of the invention, a number of notches N1 is selected that is an integer multiplier or divider of the number of teeth of the large crown Z1, and N2 that is an integer multiplier or divider of the number of teeth of the small crown Z2.

In order to avoid releasing the pawl 33 due to a substantial force and running the risk of damaging the mechanism, the forces between the crowns and the pawls must be minimized. To this end, a neutral shape for the pawl can be chosen, i.e., one that is neither engaging in nor disengaging from the notch of the crown. Thus, it has, at its end, a portion that is cylindrical with respect to its axis A3. Similarly, if the engagement of the freewheel pawl 37 in the notch is to be preferred, it will have an engaging shape, i.e., in addition to the force of the spring, the force of the crown 35 on the pawl 37 will engage it in the bottom of the notch 50.

To minimize the same forces between the crowns and the pawls, the transitions occur at moments that are synchronized with the top dead center and the bottom dead center, because it is at these moments that the pedaling torque is the lowest. This synchronization is carried out by precisely selecting the location of the mechanisms for actuating the pawls with respect to the cranks.

Once the large crown is blocked with respect to the crankset 5, the system has achieved another stable state in which the first gear train is connected, i.e., the crankset is in the first transmission ratio, namely the "small ratio".

In this stable state, the cam 39 is in the high position and the roller 63 rotates on the second trajectory 72, the cover 56 being in the deployed position. Consequently, during the rotation of the crankset, the roller 63 meets neither the first nor the second lugs 64, 65.

The torque applied to the crankset by the cyclist is transmitted to the chainwheel via the large sprocket 40. Because the large sprocket 40 and small sprocket 41 are affixed to the chainwheel, these three elements turn together at a speed 1.16 times faster than the crankset (Z1/Z3=58/50).

The small crown 36, which is in engagement with the small sprocket 41, is driven by the latter, with respect thereto, at a relative speed that is equal to the ratio between the teeth of the small sprocket and of the small crown (Z4/Z2). It is therefore in free rotation with respect to the crankset 5 at a speed equal to (Z4×Z1)/(Z2×Z3) which, in this example, is 0.94 times the speed of the crankset, i.e., at a lower speed than that of the crankset.

Figure 13:
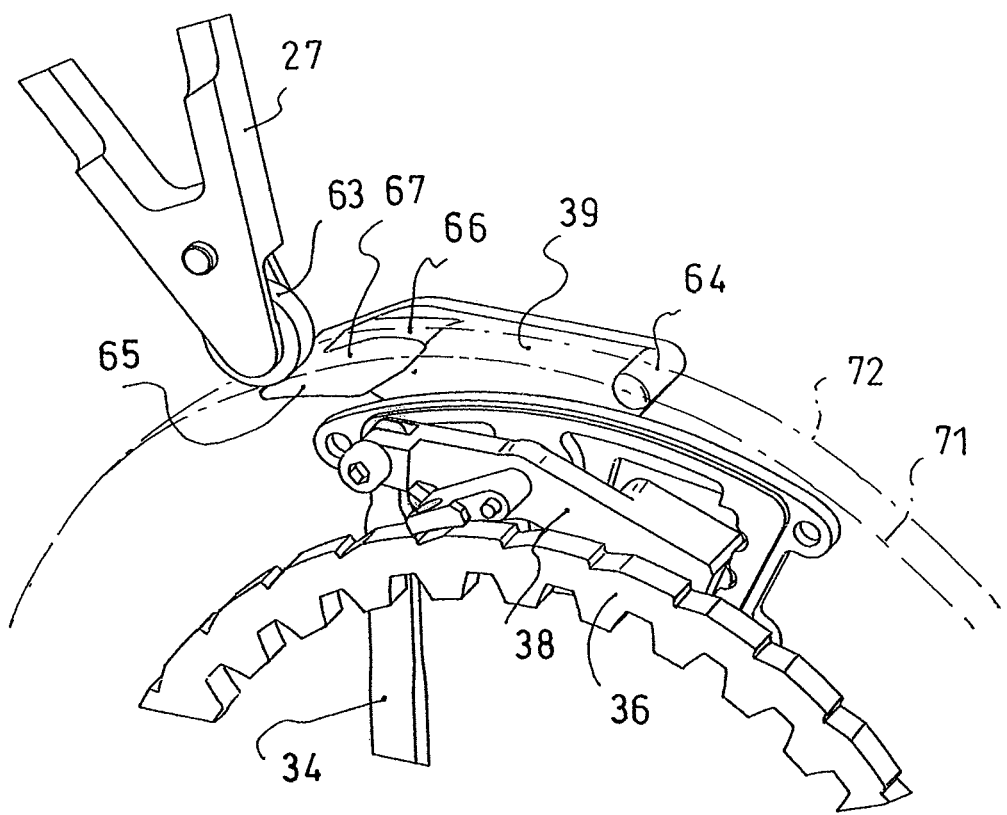
FIGS. 13, 14, and 15 are partial perspective views of the device, while the device is in a second state.
Figure 14:
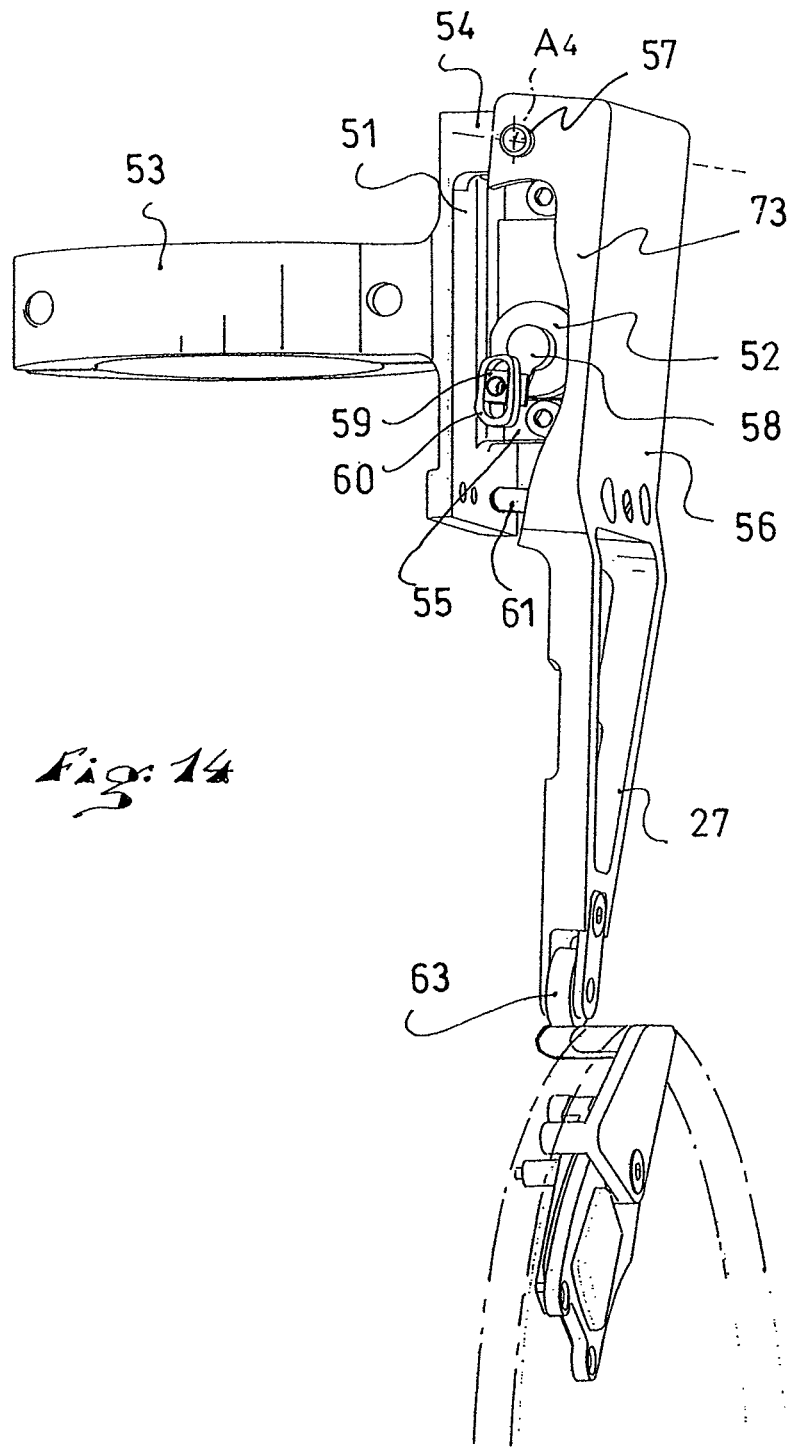
Figure 15:
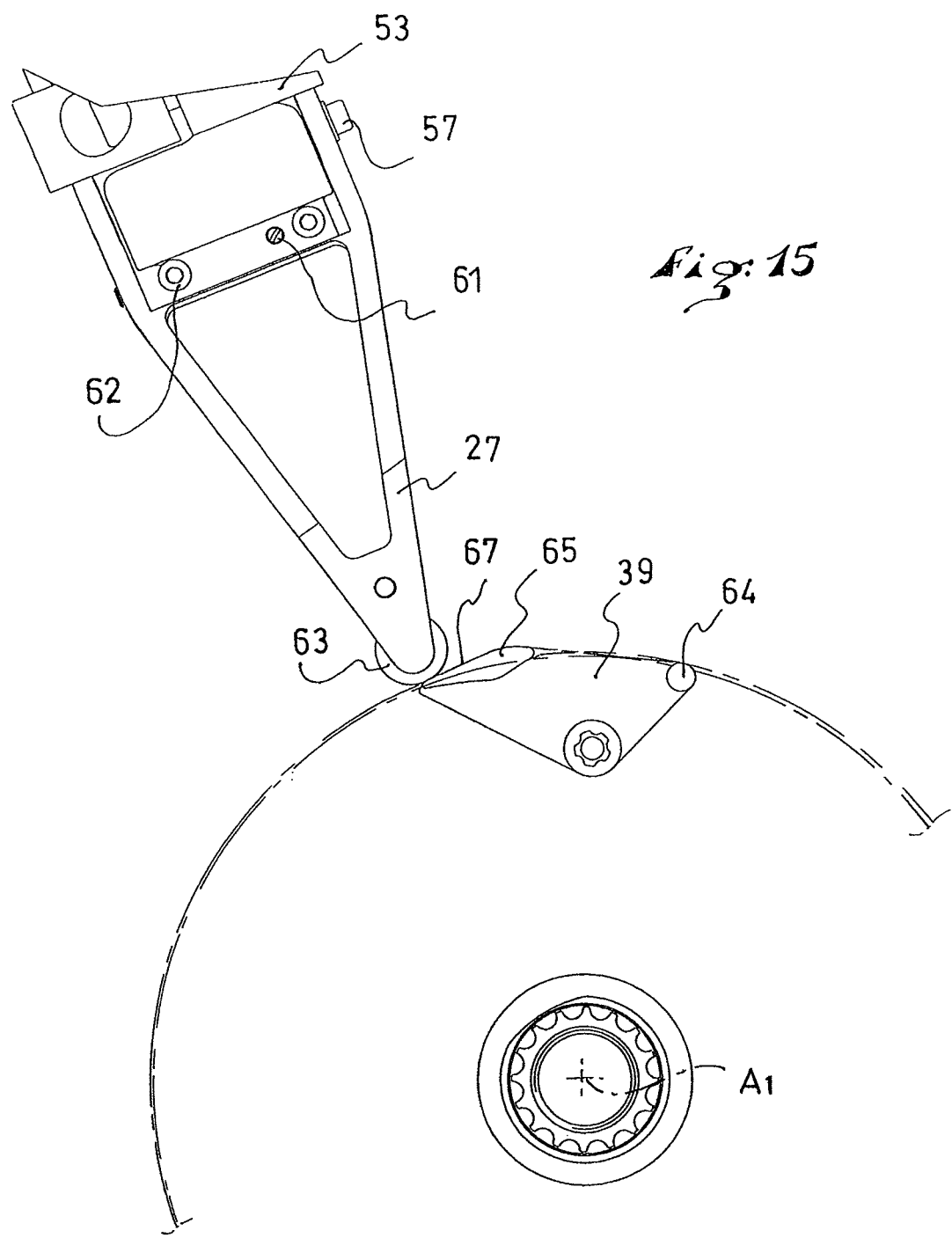

Starting from this state, while the cyclist is pedaling and a command to change the transmission ratio issued to move from the small ratio to the large ratio, the motor causes the cover 56 to move from the deployed position to the retracted position. In doing so, the roller 63 is moved to the first trajectory 71, which is blocked because the cam 39 is in the high position. FIGS. 13, 14, and 15 show the device right at the moment when the roller comes into contact with the head 67 of the second lug 65.

The head of the second lug 65 has a rolling surface against which the roller 63 presses. So that the crankset 5 can continue its rotation and is not hindered by the second lug 65, the force which the roller exerts on the rolling surface must cause the cam 39 to pivot in order to move the second lug 65 to within the diameter of the circular trajectories. In doing so, the roller 63 causes the cam 39 and the finger 38 to move in the low position.

When the finger 38 is in the low position, the tab 49 no longer retains the controlled pawl 33, which comes in contact with the small crown 36. Given that the latter turns at a lower speed than that of the crankset, everything operates as if the small crown 36 were moving backward with respect to the crankset 5. Consequently, the controlled pawl is capable of becoming embedded in the first one of the notches provided on the small crown which it encounters.

As soon as the controlled pawl 33 is engaged in a notch 50' of the small crown 36, the small crown is blocked with respect to the crankset 5, so that the pedaling torque passes instantaneously to the chainwheel 17 via the small sprocket 41. The rider is in the first stable state described hereinabove, and the large crown 35 then begins to advance faster than the crankset 5 and passes in freewheel.

In order to the reduce the duration of this transition to a minimum, the clearance between the pawl 33 and the small crown 36 must be sufficient so that it can engage in the notch 50' at a minimal rotational angle of the crankset, the ideal being for the pawl 33 to be already engaged prior to coming into contact with the notch 50'.

During movement from the small ratio to the large ratio, there is no break in the torque transmission.

The advantage of a cycle transmission device such as that of the first embodiment of the invention, which has just been described, will now be described when such device further includes a speed changing device in the area of the rear wheel of a cycle.

As mentioned hereinabove, the transmission device according to the invention is completed by a cassette of 8 sprockets positioned on the hub of the rear wheel. Because the toothed ring 19 includes 46 teeth, it can be understood, to make a comparison with a conventional system, that the transmission device according to the invention is equivalent to a device with dual chainwheels, a chainwheel having 53.36 teeth (46×1.16) and a chainwheel having 57.04 teeth (46× 1.24).

Table 3 below shows that none of the gear ratios is identical, contrary to that which has been disclosed in the prior art. Moreover, the rule for changing the sprockets and chainwheels in order to obtain an increasing and constant progression of the gear ratio is very simple. With each change of gear ratio, there is a change in the area of the crankset, and sprockets are changed one out of two times.

TABLE 3

| Gear ratio No. | Number of chainwheel teeth | Number of sprocket teeth | Gear ratio value | Variations |
| --- | --- | --- | --- | --- |
| 1 | 57.04 | 12 | 4.753 | |
| 2 | 53.36 | 12 | 4.447 | 6.90% |
| 3 | 57.04 | 14 | 4.074 | 9.14% |
| 4 | 53.36 | 14 | 3.811 | 6.90% |
| 5 | 57.04 | 16 | 3.565 | 6.91% |
| 6 | 53.36 | 16 | 3.335 | 6.90% |
| 7 | 57.04 | 18 | 3.169 | 5.24% |
| 8 | 53.36 | 18 | 2.954 | 6.90% |
| 9 | 57.04 | 21 | 2.716 | 9.14% |
| 10 | 53.36 | 21 | 2.541 | 6.90% |
| 11 | 57.04 | 24 | 2.377 | 6.91% |
| 12 | 53.36 | 24 | 2.223 | 6.90% |
| 13 | 57.04 | 28 | 2.037 | 9.14% |
| 14 | 53.36 | 28 | 1.906 | 6.90% |
| 15 | 57.04 | 32 | 1.783 | 6.91% |
| 16 | 53.36 | 32 | 1.668 | 6.90% |

All the advantages of such a device in terms of facilitating the change of ratio for the cyclist can be understood. Changing gear ratio primarily has two commands: a command for increasing and a command for decreasing the ratio. The command device automatically transmits the appropriate actuation commands to the control device 26, and possibly to the rear derailleur 8. In addition, the advantage can be understood of using electronics to manage the sequence and to make it possible to have a plurality of parallel actuation devices on handlebar bends, on handlebar grips, and even on a triathlon extension bar.

It is also noted that the progression of the gear ratio occurs much more evenly than in the prior art. Indeed, the variations expressed as a percentage between a gear ratio and the preceding one in the increasing progression do not exceed 9.14% and are on average equal to 7.27%.

Figure 16:
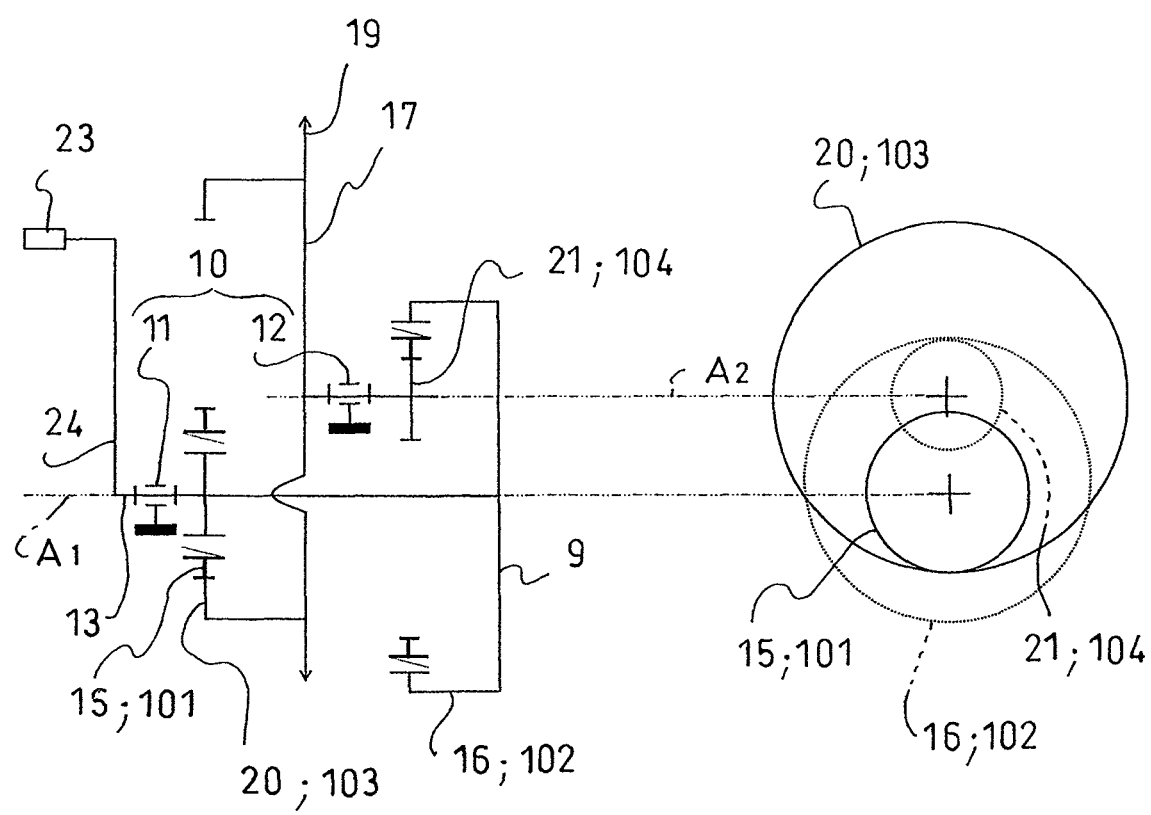
FIG. 16 is the kinematic diagram of a device according to a second embodiment of the invention.

FIG. 16 shows the kinematic diagram of a second embodiment of the invention. According to the invention, the transmission device includes a bottom bracket 10, a crankset 5 and a chainwheel 17.

The bottom bracket 10 is fixed with respect to the cycle frame and is constituted by a main body 11 centered about a first axis A1 and a secondary body 12 centered about a second axis A2, the second axis A2 being parallel to but not merged with the first axis A1.

The crankset 5 is mounted via a crankshaft 13 inside the main body 11. The cranks 24, provided to each receive a pedal 23, are also fixed on the crankshaft (only the right crank is shown in FIG. 16).

The crankset further includes a first toothed element 15, centered on the axis A1, and a second toothed element 16, also centered on the axis A1. The first toothed element 15 is in the form of a sprocket with external teeth. This sprocket is designated by the reference numeral 101 hereinafter. The second toothed element 16 is in the form of a crown with internal teeth. This crown is designated by the reference numeral 102 hereinafter.

The chainwheel 17 is rotationally mounted along the second axis A2 with respect to the secondary body 12 via a central hub 18. It further includes a third toothed element 20, centered on the axis A2 and a fourth toothed element 21, also centered on the axis A2. The third toothed element 20 is in the form of a crown with internal teeth, namely the crown 103. The fourth toothed element 21 is in the form of a sprocket with external teeth, namely the sprocket 104.

At any time one of the teeth of the first toothed element 15 and of the second toothed element 16 is in contact with one of the teeth of the third toothed element 20 and of the fourth toothed element 21, respectively.

A toothed ring 19 centered on the second axis A2 and fixed on the chainwheel 17 is capable of cooperating with the transmission chain connecting the pedaling zone to a rear sprocket of the rear wheel.

A disengageable blocking device 22 is provided to alternately block the rotation of the first toothed element 15 with respect to the crankset 5, the second toothed element 16 remaining free to turn, or the rotation of the second toothed element 16 with respect to the crankset, the first toothed element remaining free to turn. As in the first embodiment, it is also quite possible to block the rotation of a toothed element with respect to the chainwheel and the rotation of another toothed element with respect to the crankset 5.

Figure 17:
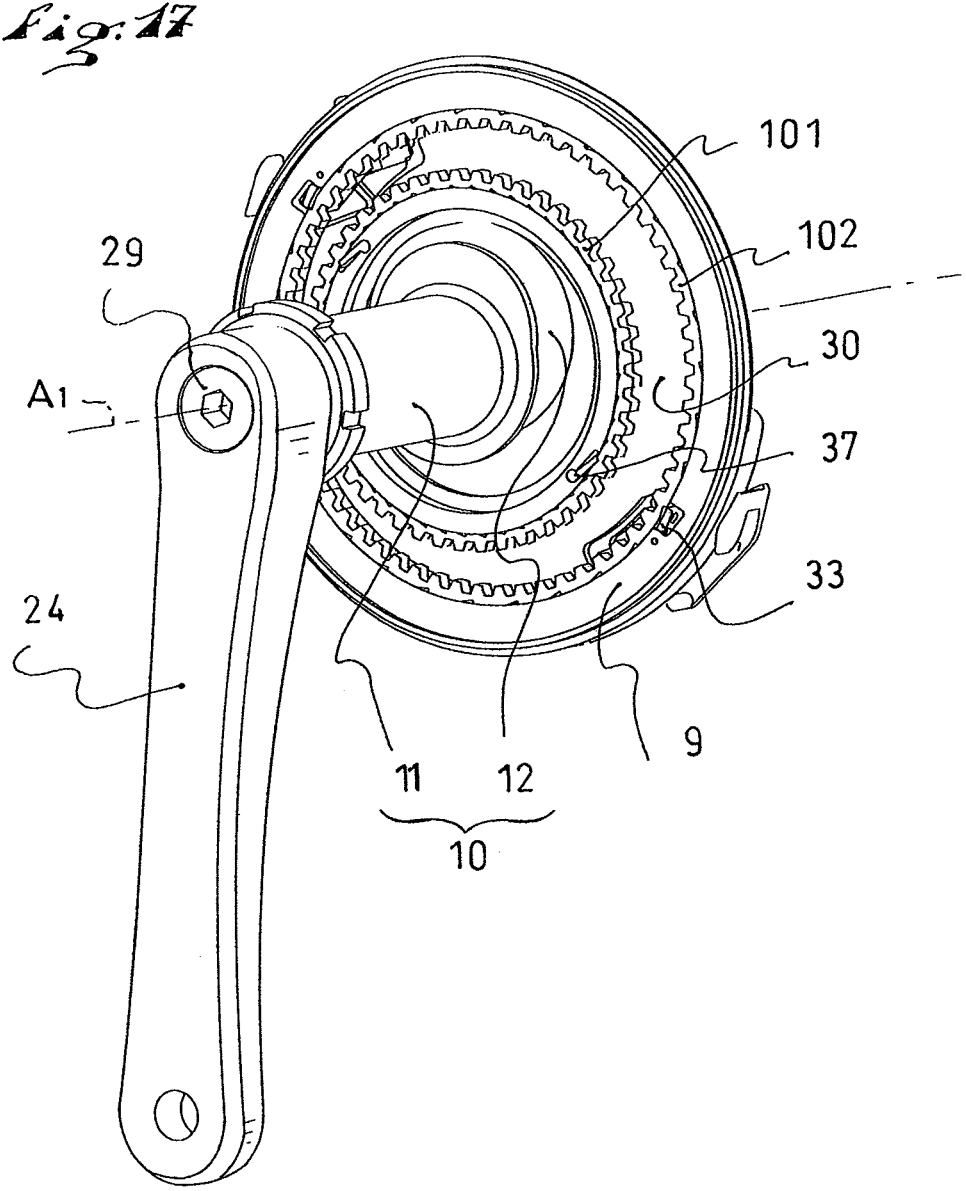
FIG. 17 is a partial left side view of the second embodiment.

FIG. 17 shows a (¾ left) perspective view of the bottom bracket 10 and of the first subassembly constituted by the crankset 5. The bottom bracket 10 includes a main body 11 and a secondary body 12. The main body 11 corresponds to a conventional bottom bracket. It is a cylindrical sleeve that is inserted in a correspondingly shaped opening provided in the frame 2. The secondary body 12 is positioned in the continuity of the main body, on its right side. The outer contours of the secondary body assume the shape of a cylindrical metal disc whose axis is parallel but offset by a value E with respect to the axis of the main body 11.

Figure 18:
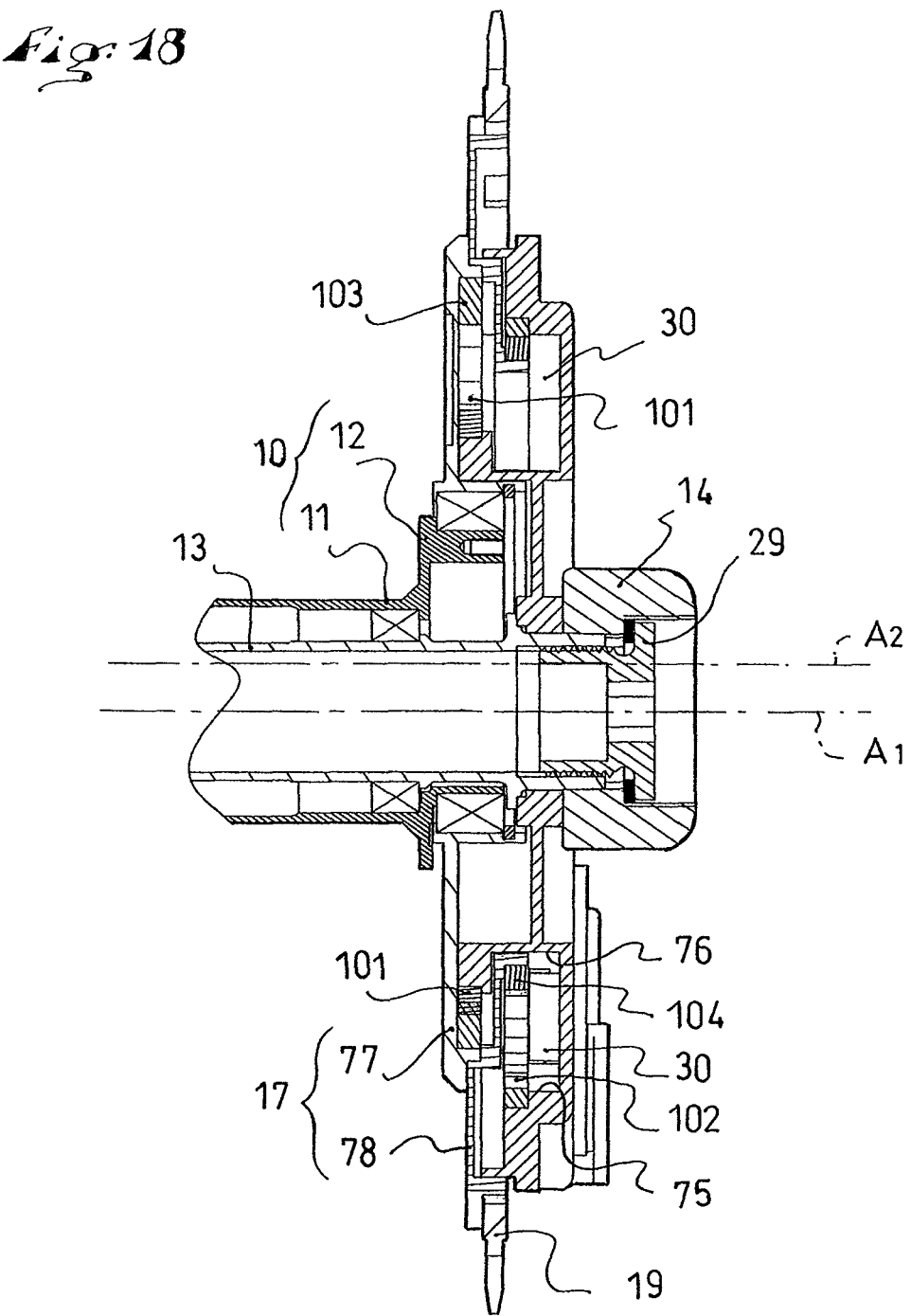
FIG. 18 is a cross-sectional view of the second embodiment.

The crankshaft 13 (see FIGS. 18 and 19) of the crankset 5 is mounted inside the bottom bracket 10 in a known manner by means of rolling bearings. The grooved ends of the crankshaft 13 overlap the on both sides bottom bracket; they are used to rotationally affix the cranks and the plate 9. The left crank 24, shown in FIG. 17, is fixed in a known manner on the crankshaft 13 by means of a screw 29. The right crank 14, shown in FIG. 18, is also fixed by means of a screw. The plate 9 is sandwiched between a shoulder provided on the crankshaft 13 and the right crank 14.

As shown in FIGS. 17 and 18, the plate 9 includes, on its left surface, a large annular cup 30 that is centered on the axis A1.

The second toothed element 16 (i.e., the crown 102) is inserted at the periphery of the large cup 30, on the peripheral side wall 75 thereof. The crown 102 is free to turn in the cup with respect to the crankset 5.

The central side wall 76 of the cup 30 is extended leftward beyond the peripheral side wall 75. It carries, at its left end, a cylindrical surface centered on the axis A1, which is provided to receive the first toothed element 15 (i.e., the sprocket 101). The sprocket 101 is free to turn on the cylindrical surface with respect to the crankset 5.

For the purpose of assembly, the chainwheel 17 includes two half-plates; the left half-plate 77 which is rotationally mounted on the secondary body 12 by means of a bearing, and the right half-plate 78, affixed to the plate 77, and on which the toothed ring 19 is fixed.

Figure 19:
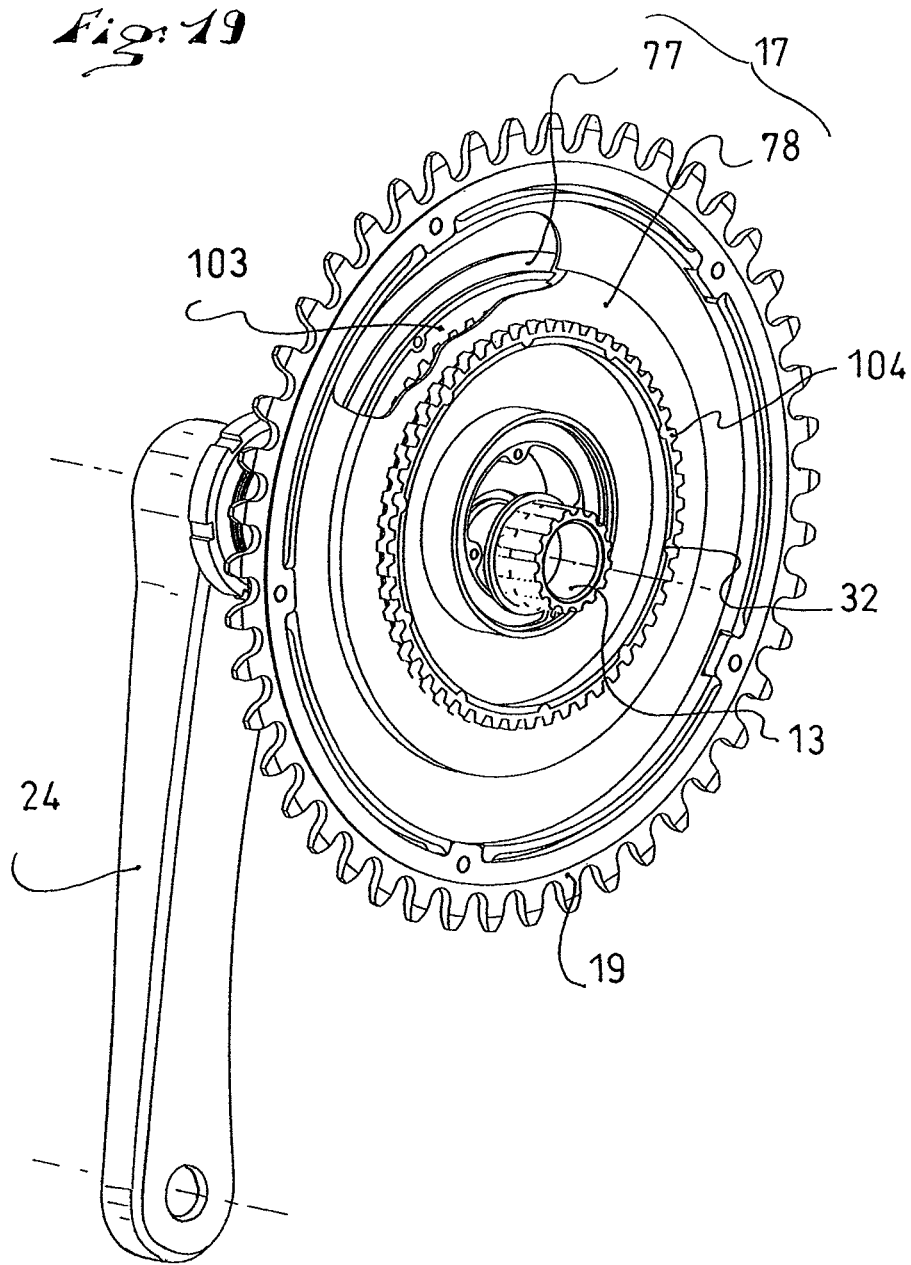
FIG. 19 is a partial right side view of the second embodiment.

The third toothed element 20 (i.e., the crown 103) is affixed to the left half-plate 77, whereas the right half-plate 78 carries the fourth toothed element 21 (i.e., the sprocket 104). Semicircular or crescent shaped recesses are provided to affix the sprocket 104 and the right half-plate 78, as well as the crown 103 and the left half-plate, as shown in FIG. 19.

Figure 20:
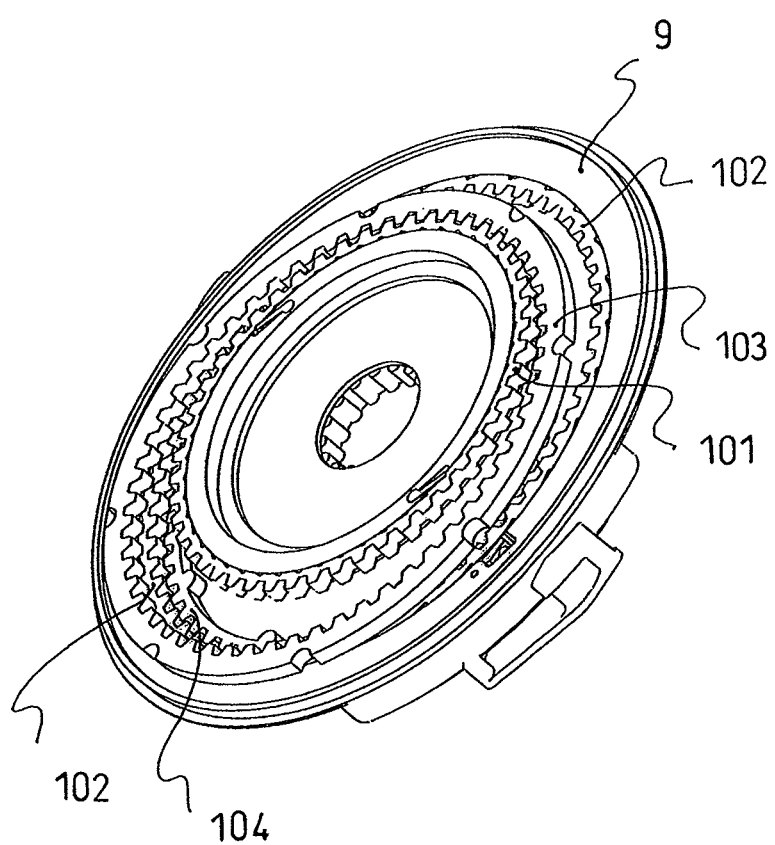
FIG. 20 is a perspective view showing the two gear trains of the second embodiments.

FIG. 20 primarily shows a perspective left view of the plate 9, the crowns, and the sprockets. The sprocket 101 and the crown 103 are adapted to mesh with one another and constitute the first gear train, whereas the crown 102 and sprocket 104 mesh and constitute the second gear train.

The primary radii of the first, second, third, and fourth toothed elements are R1, R2, R3, and R4, respectively; the number of their teeth are Z1, Z2, Z3 and Z4, respectively; the transmission ratios of the first train and second train are k1=Z1/Z3 and k2=Z2/Z4, respectively; and the modules of the first and second gear trains are m1 and m2, respectively.

In view of the geometrical arrangement of the sprockets and of the crowns, the differences "R1−R3" and "R2−R4" are equal to the value of the eccentricity E.

In the second embodiment of the invention, the modules m1 and m2 are selected such that the quotient Q of the transmission ratios k1 and k2 (Q=k2/k1) is on the same order as that found in a conventional double chainwheel, i.e., ranging, for example, between 1.15 and 1.5.

The example described here includes the same value of 1.875 mm for the modules m1 and m2; the primitive radii R1 and R2 equal to 45 mm and 56.25 mm; and the primary radii R3 and R4 equal to 52.5 mm and 48.75 mm. Consequently, the sprocket 101 has Z1=48 teeth and the crown 102 has Z2=60 teeth, whereas the crown 103 has Z3=56 teeth and the sprocket 104 has Z4=52 teeth. Under these conditions, the transmission ratio of the $1^{st}$ gear train is k1=0.86; that of the $2^{nd}$ gear train is k2=1.15, and the quotient Q is approximately 1.34.

All of the preceding values constitute particularly advantageous choices for making a transmission device according to the invention. They are shown in Table 4 below.

TABLE 4

|  |  | Crankset | Chainwheel |
|---|---|---|---|
|  |  | $1^{st}$ toothed element (sprocket 101) | $3^{rd}$ toothed element (crown 103) |
| "Small ratio" | Radius | $R_1$ = 45 mm | $R_3$ = 52.5 mm |
|  | Number of teeth | $Z_1$ = 48 | $Z_3$ = 56 |
|  | Module |  | m1 = 1.875 |
|  | Transmission ratio |  | $K_1$ = 48/56 = 6/7 = 0.857 . . . |
|  | Freewheel notches |  | $N_1$ = 26 |
|  |  | $2^{nd}$ toothed element (crown 102) | $4^{th}$ toothed element (sprocket 104) |
| "Large ratio" | Radius | $R_2$ = 56.25 mm | $R_4$ = 48.75 mm |
|  | Number of teeth | $Z_2$ = 60 | $Z_4$ = 52 |
|  | Module |  | m2 = 1.875 |
|  | Transmission ratio |  | $K_2$ = 60/52 = 15/13 = 1.153 . . . |
|  | Freewheel notches free wheel |  | $N_2$ = 35 |
| Quotient of the transmission ratios |  | Q = K2/K1 = (15 × 7)/(13 × 6) = 35/26 = N2/N1 | |

According to the invention, the transmission device also includes a blocking, or disengageable, device 22 for the selective blocking of the crown 102 or of the sprocket 101 with respect to the plate 9 of the crankset 5. The blocking device 22 is constituted by the cooperation of several pawls with notches provided on the circumference of the crown 102 and of the sprocket 101.

As in the first embodiment, the disengageable blocking device is constituted by freewheels provided between the sprocket 101, the crown 102, and the plate 9, respectively.

The blocking device 22 includes a pair of free pawls 37 cooperating with notches provided inside the sprocket 101 and a pair of controlled pawls 33 cooperating with notches provided at the periphery of the crown 102. As in the first embodiment, these pawls are biased for engagement in the notches by means of springs.

A pair of actuating mechanisms 28, substantially identical to those described and illustrated with reference to the first embodiment of the invention, are positioned on the plate in order to actuate the controlled pawls 33. These actuating mechanisms are also wedged angularly on the top and bottom dead centers in order to minimize the force on the controlled pawls 33 and to have a smoother transition. As previously described, the pawls 33 are ideally neutral and the pawls 37 ideally engaging. Therefore, they are not described in additional detail here. Similarly, the control device and the command device fixed on the frame are not described in further detail.

Advantageously, the transmission device according to the second embodiment can replace a crankset including two conventional toothed chainwheels, for which the passage of the transmission chain from one chainwheel to the other is carried out by means of a front derailleur similar to those of the prior art. For example, if the toothed ring 19 comprises 46 teeth, the transmission device replaces a crankset comprising a small chainwheel having approximately 39 teeth (46×0.857) and a large chainwheel having approximately 53 teeth (46×1.15).

In the device according to the invention, unlike a conventional double chainwheel, the change of ratio requires only limited mechanical effort (the passage of the cover 56 from the retracted position to the deployed position), so that this passage can be easily automated by electrical means, for a minimal energy expenditure. Furthermore, the change of ratio can be controlled mechanically with a known cable tension system.

An alternative version of the second embodiment can replace a conventional triple chainwheel. To this end, two additional toothed elements are necessary in order to constitute a third gear train. The blocking device can then include two pairs of controllable pawls associated with two of the gear trains and a pair of free pawls associated with the third gear train.

The invention is not limited to the particular embodiments which have been described, and includes all of the technical equivalents that fall within the scope of the claims. Although the embodiments described above only relate to bicycles whose motive torque is generated by the legs of the cyclist, it is easily understood that a device according to the invention can be used for any cycle (tricycle, quadricycle, etc.), irrespective of the source of the engine torque (legs, arms, etc.).

This invention illustratively disclosed herein suitably may be practiced in the absence of any element which is not specifically disclosed herein.

The invention claimed is:

1. A transmission device for a cycle, said device comprising:
    a bottom bracket fixed relative to a cycle frame, said bottom bracket including a cylindrical main body centered about a first axis and a secondary body centered about a second axis, said second axis being parallel to, but not merged with, said first axis;
    a crankset rotationally mounted along the first axis relative to the main body, said crankset comprising:
        a pair of cranks;
        a first circular toothed element centered on the first axis;
        a second circular toothed element centered on the first axis;
    a chainwheel rotationally mounted along the second axis relative to the secondary body, said chainwheel comprising:
        a third circular toothed element centered on the second axis;
        a fourth circular toothed element centered on the second axis;
    said first and third toothed elements constituting a first gear train and said second and fourth toothed elements constituting a second gear train;
    at least one of said first, second, third and fourth toothed elements having radially internal teeth;
    a disengageable blocking device to block selectively the following:
        rotation of the first toothed element relative to the crankset or rotation of the third toothed element relative to the chainwheel; and
        rotation of the second toothed element relative to the crankset or rotation of the fourth toothed element relative to the chainwheel.

2. A device according to claim 1, wherein:
    the disengageable blocking device includes at least first and second pawls structured and arranged to cooperate with a plurality of notches;
    said first pawl allowing unidirectional rotation of said first toothed element relative to the crankset, or of said third toothed element relative to the chainwheel; and
    said second pawl allowing the unidirectional rotation of said second toothed element relative to the crankset, or of the fourth toothed element relative to the chainwheel.

3. A device according to claim 2, further comprising:
    a control device;
    at least the first pawl is a controlled pawl controlled by the control device constructed and arranged to be controlled by a user;
    at least the second pawl is a free pawl.

4. A device according to claim 3, further comprising:
    an actuating mechanism to actuate said controlled pawl, said actuating mechanism comprising:
        a tab constructed and arranged to retract said controlled pawl from an engaged position in one of said notches; and
        a cam constructed and arranged to be movable between either of two stable positions under action of said control device.

5. A device according to claim 1, wherein:
    said first toothed element is a large crown with radially internal teeth;
    said second toothed element is a small crown with radially internal teeth;
    said third toothed element is a large sprocket with radially external teeth; and said fourth toothed element is a small sprocket with radially external teeth.

6. A device according to claim 5, wherein:
said plurality of notches comprises notches positioned on the large crown and notches positioned on said small crown.

7. A device according to claim 5, wherein:
said large crown includes fifty-eight teeth;
said small crown includes thirty-one teeth;
said large sprocket includes fifty teeth; and
said small sprocket includes twenty-five teeth.

8. A device according to claim 1, wherein:
said first toothed element is a sprocket with radially external teeth;
said second toothed element is a crown with radially internal teeth;
said third toothed element is a crown with radially internal teeth; and
said fourth toothed element is a sprocket with radially external teeth.

9. A device according to claim 8, wherein:
said plurality of notches comprises notches positioned on the third toothed element and notches positioned on the fourth toothed element.

10. A device according to claim 8, wherein:
said first toothed element includes forty-eight teeth;
said second toothed element includes sixty teeth;
said third toothed element includes fifty-six teeth; and
said fourth toothed element includes fifty-two teeth.

11. A device according to claim 1, wherein:
the first and third toothed elements are in constant respective engagement and the second and fourth toothed elements are in constant respective engagement.

12. A device according to claim 1, wherein:
the chainwheel and the crankset turn concurrently in the same direction.

13. A cycle comprising:
a frame including a bottom bracket, said bottom bracket comprising a cylindrical main body centered about a first axis and a secondary body centered about a second axis, said second axis being parallel to, but not merged with, said first axis;
a transmission device comprising:
  a crankset rotationally mounted along the first axis relative to the main body, said crankset comprising:
    a pair of cranks;
    a first circular toothed element centered on the first axis;
    a second circular toothed element centered on the first axis;
  a chainwheel rotationally mounted along the second axis relative to the secondary body, said chainwheel comprising:
    a third circular toothed element centered on the second axis;
    a fourth circular toothed element centered on the second axis;
  said first and third toothed elements constituting a first gear train and said second and fourth toothed elements constituting a second gear train;
  at least one of said first, second, third and fourth toothed elements having radially internal teeth;
  a disengageable blocking device to block selectively the following:
    rotation of the first toothed element relative to the crankset or rotation of the third toothed element relative to the chainwheel; and
    rotation of the second toothed element relative to the crankset or rotation of the fourth toothed element relative to the chainwheel.

14. A cycle according to claim 13, wherein:
the first and third toothed elements are in constant respective engagement and the second and fourth toothed elements are in constant respective engagement.

15. A cycle according to claim 13, wherein:
the chainwheel and the crankset turn concurrently in the same direction.

\* \* \* \* \*